US011899502B2

(12) United States Patent
Hung et al.

(10) Patent No.: US 11,899,502 B2
(45) Date of Patent: Feb. 13, 2024

(54) LAPTOP COMPUTERS WITH A MOVABLE ACCESSORY HOUSING

(71) Applicant: Intel Corporation, Santa Clara, CA (US)

(72) Inventors: Vincent Hung, Taipei (CN); Jeff Ku, Taipei (CN); Andy B. Wang, Taipei (CN); Duck Young Kong, Beaverton, OR (US); Chunlin Bai, Chengdu (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/626,750

(22) PCT Filed: Sep. 10, 2019

(86) PCT No.: PCT/CN2019/105110
§ 371 (c)(1),
(2) Date: Jan. 12, 2022

(87) PCT Pub. No.: WO2021/046712
PCT Pub. Date: Mar. 18, 2021

(65) Prior Publication Data
US 2022/0269311 A1      Aug. 25, 2022

(51) Int. Cl.
*G06F 1/16*        (2006.01)
(52) U.S. Cl.
CPC .......... *G06F 1/1656* (2013.01); *G06F 1/1618* (2013.01); *G06F 1/1679* (2013.01); *G06F 1/1686* (2013.01)

(58) Field of Classification Search
CPC .... G06F 1/1616; G06F 1/1618; G06F 1/1656; G06F 1/1686
See application file for complete search history.

(56) References Cited

U.S. PATENT DOCUMENTS 5,012,348 A * 4/1991 Witzel ................... H04N 7/142
                                                                  396/428
5,292,099 A * 3/1994 Isham .................. A47B 21/045
                                                                  248/447.2

(Continued)

FOREIGN PATENT DOCUMENTS

JP       2001-298654 A     10/2001
JP       2002-189532 A      7/2002

(Continued)

OTHER PUBLICATIONS

International Searching Authority, "International Search Report," mailed in connection with International Patent Application No. PCT/CN2019/105110, dated Jun. 5, 2020, 4 pages.

(Continued)

*Primary Examiner* — Adrian S Wilson
(74) *Attorney, Agent, or Firm* — HANLEY, FLIGHT & ZIMMERMAN LLC

(57) ABSTRACT

Laptop computers with a movable accessory housing are described herein. An example laptop computer incudes a base, a lid moveably coupled to the base, a display carried by the lid, an arm pivotably coupled to the lid, and an accessory housing carried by the arm. The arm is pivotable to move the accessory housing between a first position in which the accessory housing is disposed along a bottom edge of the lid and a second position in which the accessory housing is disposed along a top edge of the lid.

17 Claims, 16 Drawing Sheets

(56) References Cited

U.S. PATENT DOCUMENTS

| | | | | |
|---|---|---|---|---|
| 5,318,257 A * | 6/1994 | Tani | | F16M 11/10 |
| | | | | 396/428 |
| 5,475,441 A * | 12/1995 | Parulski | | H04N 1/2112 |
| | | | | 348/158 |
| 5,500,671 A * | 3/1996 | Andersson | | H04N 7/144 |
| | | | | 348/E7.083 |
| 5,526,180 A * | 6/1996 | Rausnitz | | G02B 7/006 |
| | | | | 359/601 |
| D377,032 S * | 12/1996 | Morooka | | D16/202 |
| 5,615,854 A * | 4/1997 | Nomura | | H04N 7/142 |
| | | | | 248/220.22 |
| 5,655,833 A * | 8/1997 | Raczynski | | F21V 21/30 |
| | | | | 362/427 |
| 5,719,799 A * | 2/1998 | Isashi | | G06F 1/169 |
| | | | | 345/169 |
| 5,768,163 A * | 6/1998 | Smith, II | | G06F 1/1601 |
| | | | | 361/679.28 |
| 5,801,919 A * | 9/1998 | Griencewic | | G06F 1/1616 |
| | | | | 361/679.26 |
| 5,906,348 A * | 5/1999 | Orenstein | | G06F 1/1607 |
| | | | | 248/311.2 |
| 6,141,052 A * | 10/2000 | Fukumitsu | | G06F 1/1616 |
| | | | | 348/E5.025 |
| 6,323,902 B1 * | 11/2001 | Ishikawa | | G06F 1/1607 |
| | | | | D14/125 |
| 6,411,332 B1 * | 6/2002 | Whitby | | H04N 23/50 |
| | | | | 348/E5.025 |
| 6,424,369 B1 * | 7/2002 | Adair | | G06F 1/1671 |
| | | | | 455/566 |
| 6,587,151 B1 * | 7/2003 | Cipolla | | G06F 1/1607 |
| | | | | D16/202 |
| 6,697,117 B1 * | 2/2004 | Park | | H04N 23/51 |
| | | | | 348/E5.026 |
| 6,798,457 B2 * | 9/2004 | Boyden | | H04N 7/144 |
| | | | | 348/373 |
| 6,812,958 B1 * | 11/2004 | Silvester | | H04N 23/51 |
| | | | | 348/E5.026 |
| 6,848,842 B2 * | 2/2005 | Saruhashi | | H04N 23/50 |
| | | | | 348/E5.025 |
| 6,970,202 B1 * | 11/2005 | Glogan | | F16M 13/02 |
| | | | | 348/207.1 |
| 7,016,183 B2 * | 3/2006 | Takemoto | | G06F 1/1677 |
| | | | | 361/679.07 |
| D519,972 S * | 5/2006 | Chung | | D14/138 AC |
| 7,046,287 B2 * | 5/2006 | Nishino | | H04M 1/0216 |
| | | | | 348/E7.079 |
| 7,061,536 B2 * | 6/2006 | Cha | | G06F 1/1637 |
| | | | | 348/376 |
| 7,136,282 B1 * | 11/2006 | Rebeske | | G06F 1/1654 |
| | | | | 361/679.55 |
| D543,169 S * | 5/2007 | Kim | | D14/138 AC |
| D545,795 S * | 7/2007 | Kim | | D14/138 AC |
| D546,307 S * | 7/2007 | Lee | | D14/138 AC |
| 7,286,181 B2 * | 10/2007 | Cha | | G06F 1/1637 |
| | | | | 348/374 |
| D559,821 S * | 1/2008 | Lee | | D14/138 AC |
| D560,183 S * | 1/2008 | Kim | | D14/138 AC |
| 7,352,565 B2 * | 4/2008 | Yin | | G06F 1/1679 |
| | | | | 361/679.55 |
| 7,411,616 B2 * | 8/2008 | Shimizu | | H04N 23/50 |
| | | | | 348/E5.025 |
| 7,489,503 B2 * | 2/2009 | Maatta | | G06F 1/1624 |
| | | | | 16/367 |
| 7,492,891 B2 * | 2/2009 | Eldon | | H04M 1/0247 |
| | | | | 455/575.4 |
| 7,630,193 B2 * | 12/2009 | Ledbetter | | F16M 11/2021 |
| | | | | 361/679.21 |
| 7,631,979 B1 * | 12/2009 | Brown | | F21V 33/0052 |
| | | | | 362/11 |
| D615,056 S * | 5/2010 | Kim | | D14/138 AB |
| D615,063 S * | 5/2010 | Jeong | | D14/138 AB |
| 7,800,648 B2 * | 9/2010 | Lu | | H04N 23/51 |
| | | | | 348/207.1 |
| 7,973,856 B2 * | 7/2011 | Lee | | G06F 1/1686 |
| | | | | 396/428 |
| 8,072,536 B1 * | 12/2011 | Campbell | | G03B 17/561 |
| | | | | 348/374 |
| 8,208,249 B2 * | 6/2012 | Chin | | G06F 1/1618 |
| | | | | 361/679.55 |
| 8,325,239 B2 * | 12/2012 | Kaplan | | H04N 23/51 |
| | | | | 348/207.1 |
| 8,649,166 B2 * | 2/2014 | Wu | | G06F 1/1626 |
| | | | | 361/679.55 |
| 8,842,423 B2 | 9/2014 | Griffin | | |
| 8,941,715 B1 * | 1/2015 | McNelley | | H04N 7/15 |
| | | | | 348/14.16 |
| 8,982,572 B2 | 3/2015 | Hsu et al. | | |
| 9,152,171 B1 * | 10/2015 | Wu | | G06F 1/166 |
| 9,494,844 B2 * | 11/2016 | Fisher | | F21V 21/26 |
| 9,686,456 B2 * | 6/2017 | Wu | | H04N 23/50 |
| 9,983,632 B2 * | 5/2018 | Kuscher | | G06F 1/1616 |
| 10,126,781 B2 * | 11/2018 | Ahn | | H04M 1/0264 |
| 10,216,068 B2 * | 2/2019 | Godfrey | | H04N 23/50 |
| 10,444,802 B2 * | 10/2019 | Zeng | | G06F 1/1686 |
| 10,579,108 B2 * | 3/2020 | Dilaura | | H04M 1/0264 |
| 10,678,300 B2 * | 6/2020 | Perelli | | G06F 1/1618 |
| 10,747,273 B1 * | 8/2020 | Wang | | H04N 23/57 |
| 10,880,419 B2 * | 12/2020 | Gong | | H04N 23/57 |
| 11,082,588 B2 * | 8/2021 | Zou | | H04N 23/50 |
| 11,360,516 B2 * | 6/2022 | Kierska | | G06F 1/1647 |
| 11,381,776 B2 * | 7/2022 | Nimmo | | F16M 13/022 |
| 2002/0085371 A1 * | 7/2002 | Katayama | | G06F 1/1637 |
| | | | | 362/23.05 |
| 2005/0078211 A1 * | 4/2005 | Whitehorn | | H04N 23/51 |
| | | | | 348/E5.026 |
| 2005/0151042 A1 * | 7/2005 | Watson | | F16M 11/40 |
| | | | | 348/E7.079 |
| 2005/0186985 A1 * | 8/2005 | Im | | H04M 1/022 |
| | | | | 455/575.3 |
| 2006/0077286 A1 * | 4/2006 | Wenderski | | G03B 17/561 |
| | | | | 348/E5.025 |
| 2007/0126924 A1 * | 6/2007 | Shi | | H04N 23/50 |
| | | | | 348/E5.025 |
| 2007/0217135 A1 * | 9/2007 | Chuang | | G06F 1/1681 |
| | | | | 361/679.05 |
| 2008/0158811 A1 * | 7/2008 | Stewart | | F16M 13/02 |
| | | | | 361/679.4 |
| 2009/0231484 A1 | 9/2009 | Lee | | |
| 2009/0284648 A1 * | 11/2009 | Sung | | H04N 7/142 |
| | | | | 348/373 |
| 2012/0176741 A1 * | 7/2012 | Wu | | G06F 1/1686 |
| | | | | 361/679.28 |
| 2012/0243200 A1 * | 9/2012 | Sutton | | G03B 15/02 |
| | | | | 362/11 |
| 2015/0034206 A1 | 11/2015 | Joe | | |
| 2017/0094038 A1 * | 3/2017 | Chen | | H04M 1/0264 |
| 2017/0262018 A1 * | 9/2017 | Kim | | G06F 1/1658 |
| 2018/0262663 A1 * | 9/2018 | Zhang | | H04M 1/0264 |
| 2018/0343760 A1 | 11/2018 | Lee et al. | | |
| 2019/0138062 A1 * | 5/2019 | Zeng | | H04M 1/0235 |
| 2019/0174051 A1 | 6/2019 | Isonaga | | |
| 2020/0084307 A1 * | 3/2020 | Gong | | H04N 23/57 |
| 2020/0356140 A1 * | 11/2020 | Kim | | G06F 3/0482 |
| 2021/0157370 A1 | 5/2021 | Tam | | |
| 2021/0181805 A1 | 6/2021 | Ho | | |

FOREIGN PATENT DOCUMENTS

| | | |
|---|---|---|
| JP | 2004145540 A | 5/2004 |
| JP | 2012-238333 A | 12/2012 |
| JP | 2013-025420 A | 2/2013 |
| JP | 2014-211765 A | 11/2014 |
| JP | 2016-200898 A | 12/2016 |
| JP | 2017-091150 A | 5/2017 |
| JP | 2017-517694 A | 6/2017 |
| WO | 2019009878 A1 | 1/2019 |

(56) References Cited

FOREIGN PATENT DOCUMENTS

| WO | 2019070253 A1 | 4/2019 |
|----|---------------|--------|
| WO | 2021046712 A1 | 3/2021 |

OTHER PUBLICATIONS

International Searching Authority, "Written Opinion," mailed in connection with International Patent Application No. PCT/CN2019/105110, dated Jun. 5, 2020, 5 pages.
European Patent Office, "European Search Report," issued in connection with European Patent Application No. 19945000.8, dated May 10, 2023, 5 pages.
Intellectual Property India, "Examination Report," issued in connection with Appl. No. 20224706859, dated Feb. 6, 2023, 6 pages.
ASCII editorial department, "Get a kickstand that makes Surface Pro even more convenient for collaboration!", retrieved from: https://ascii.jp/elem/000/001/907/1907743, dated Aug. 3, 2019, 10 pages. [English translation included].
Japan Patent Office, "Search Report by Registered Search Organization," issued in connection with Japanese Patent Application No. 2022-508481, dated Sep. 29, 2023, 76 Pages. [English Translation Included].
Japan Patent Office, "Notice of Reasons of Rejection" issued in connection with Japanese Application No. 2022-508481, dated Oct. 17, 2023, 6 pages.

\* cited by examiner

LAPTOP COMPUTERS WITH A MOVABLE ACCESSORY HOUSING

FIELD OF THE DISCLOSURE

This disclosure relates generally to laptop computers and, more particularly, to laptop computers with a movable accessory housing.

BACKGROUND

Laptop computers typically include a camera and one or more antennas. The camera and antenna(s) are typically integrated into the display or lid of the laptop.

Figure 1:
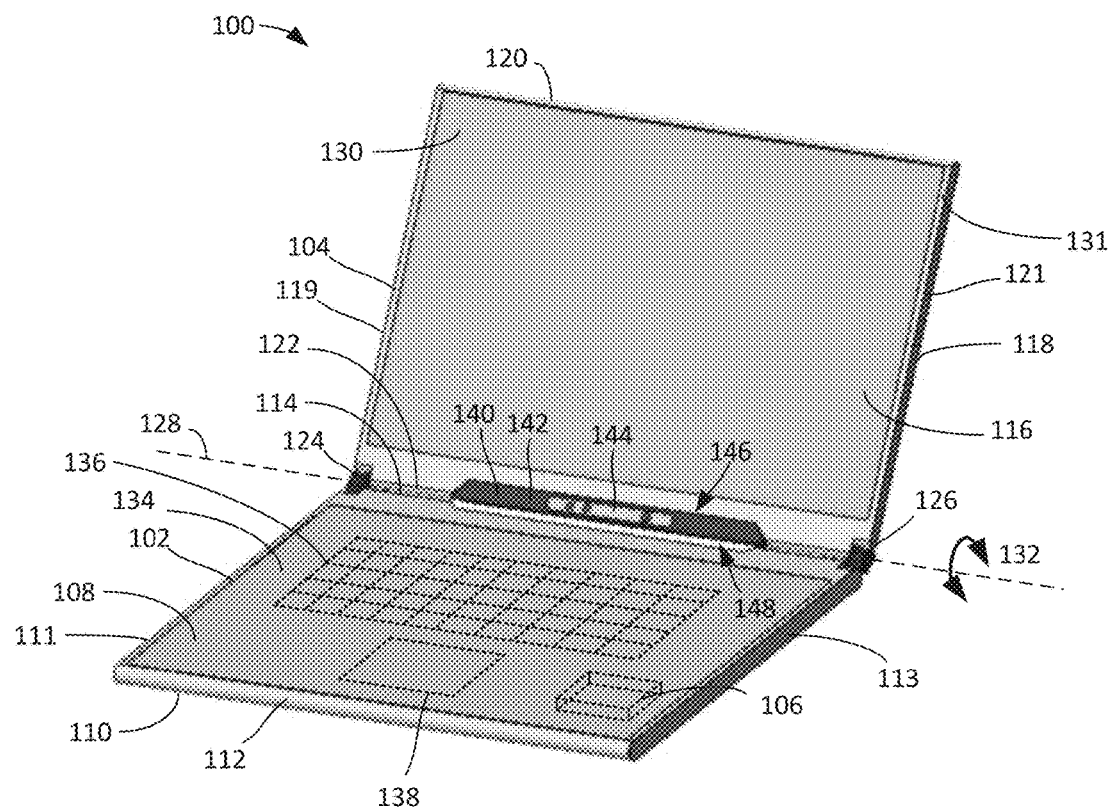
FIG. 1 is a front, right perspective view of an example laptop computer constructed in accordance with the teachings of this disclosure. The example laptop computer includes an example accessory housing that is shown in a lower position.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Laptop computers typically include a base (which includes a keyboard and houses the electronic components) and a lid (which includes a display such as a touchscreen) that is hingedly coupled to the base. The lid can be rotated between a closed position and an open position in which the lid is angled relative to the base. A convertible laptop computer is a type of laptop computer in which the lid with the display can be rotated 360° relative to the base, such that display faces upward and the laptop computer can be held and/or used similar to a tablet.

In recent years, laptop computers (such as convertible laptop computers) have been equipped with a camera. In most known laptop computers, the camera is incorporated into the lid itself and positioned on a bezel that surrounds the display. As such, the camera is permanently fixed relative to the lid and/or bezel. However, this fixed configuration increases the thickness of the lid and the size of the bezel, which is undesirable. In particular, consumers typically prefer lids or displays that are relatively thin with a small (e.g., minimal) bezel to increase (e.g., maximize) screen space. Some known laptops manufacturers have attempted to reduce the size of the camera module, but doing so reduces the size of the CMOS sensor, which results in lower image resolution, lower camera quality and more expensive camera modules. This problem is also exacerbated by the need for antennas. Most conventional laptop computers also incorporate antennas in the lid to facilitate wireless communication (e.g., WIFI, Bluetooth®). Including such antenna(s) in the lid requires a relatively thick lid and a large bezel.

To attempt to reduce the dimensions of the bezel, some known laptop computers have a bumped-up region extending above the top edge of the display to accommodate the camera and/or antennas. However, such a bumped up region is unsightly. Further, in the closed position, the bumped up region extends beyond the base of the laptop, which places the camera in a more vulnerable position for damage.

Other known laptop computers have moved the camera and antennas to the bottom edge of the display. However, in that position, the camera is not located at a desirable image capturing position. In particular, the camera is angled upward and only captures the bottom or upward looking angle of the user's face, which may not be flattering and/or may not present an accurate or desirable view of the user. Further, by putting the antennas in or near the base, the chassis of the base and the electronic components in the base may block or interfere with the antenna signals.

Disclosed herein are example laptop computers that address the above and/or other drawbacks. Example laptop computers disclosed herein include a base, a lid hingedly coupled to the base, and an accessory housing that can be moved from a lower position at or near a bottom edge of the lid to an upper position at or near a top edge of the lid. The accessory housing includes one or more cameras. In some examples disclosed herein the accessory housing includes two opposite facing cameras. One camera faces the user and the other camera faces the surrounding environment when the lid is open.

In the lower position, the accessory housing of some examples is disposed along the bottom edge of the lid between the lid and the base. The accessory housing can be placed in the lower position, for example, when the user is not using the camera(s) and/or when the laptop computer is closed. When it is desired to use one or both of the cameras, the accessory housing can be moved to the upper position at or near (e.g., along) the top edge of the lid where the camera(s) is/are placed in a more desirable image-capturing position.

In some examples disclosed herein, the example laptop computer includes an arm that moveably couples the accessory housing to the lid. In some examples, the arm is pivotably coupled to the back side of the lid, and the accessory housing is coupled to a distal end of the arm. The arm can be rotated about a hingeline to move the accessory housing between the upper and lower positions, which keeps the accessory housing connected to the lid to thereby avoid loss of the same.

In some examples, one or more antennas and/or sensors are also included in the accessory housing adjacent the camera. As such, when the accessory housing is in the upper position, the antennas are positioned where there is less interference from the base of the laptop and less obstruction from the lid and the base. Further, because the camera and the antennas are not disposed in the lid, the lid can be sized relative thin (e.g., 0.8 mm or less). Moreover, the bezel can be reduced (e.g., minimized) or completely eliminated. As such, examples disclosed herein enable a higher display-to-body ratio than known laptop computers. Further, the accessory housing can be sized to accommodate larger, higher quality cameras, sensors, antennas, etc. without increasing the size of the bezel or lid and potentially, even enabling the decreasing of the size of the bezel and/or lid.

Figure 2:
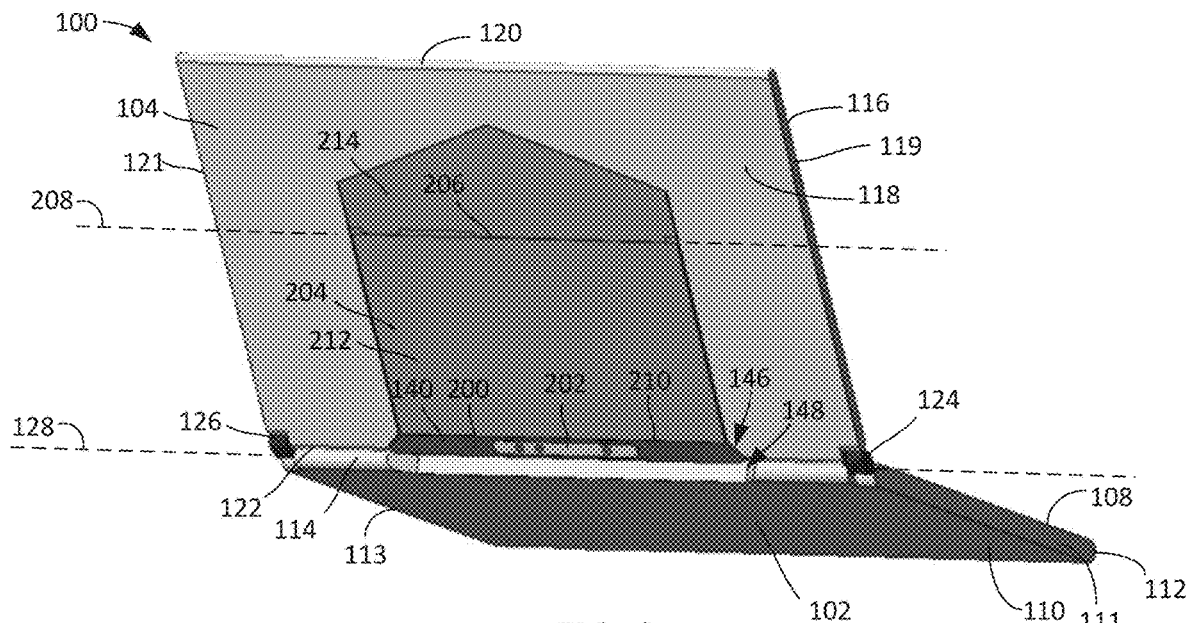
FIG. 2 is rear, left perspective view of the example laptop computer of FIG. 1 with the example accessory housing in the lower position.

FIGS. 1 and 2 are front and rear perspective views of an example laptop computer 100 constructed in accordance with teachings of this disclosure. In the illustrated example, the laptop computer 100 includes a base 102 (a first portion) and a lid 104 (a second portion) that are moveably coupled (e.g., hingedly coupled). The lid 104 can also be referred to as a top. The base 102 and the lid 104 may together form a clamshell housing. The base 102 and/or the lid 104 may be constructed of aluminum, plastic, and/or any other material or combination of materials. The base 102 contains electrical components 106 of the laptop computer 100. The electrical components 106 may include, for example, processor circuitry (e.g., a central processing unit (CPU), a graphics processing unit (GPU), processor core(s), etc.), one or more storage devices (e.g., solid state memory), one or more batteries, one or more cooling devices (e.g., fans), and/or other hardware and/or circuitry.

As shown in FIGS. 1 and 2, the base 102 has a first side 108, referred to herein as a top side 108, and a second side 110, referred to herein as a bottom side 110, opposite the top side 108. The base 102 also has a first edge 112, referred to herein as a front edge 112, a second edge 114, referred to herein as a rear edge 114, opposite the front edge 112, a third edge 111, referred to as a left edge 111, and a fourth edge 113, referred to as right edge 113, opposite the left edge 111. The lid 104 has a first side 116, referred to herein as a front side 116, and a second side 118, referred to herein as a back side 118, opposite the front side 116. The lid 104 also has a first edge 120, referred to herein as a top edge 120, a second edge 122, referred to herein as a bottom edge 122, opposite the top edge 120, a third edge 119, referred to as a left edge 119, and a fourth edge 121, referred to as a right edge 121, opposite the left edge 119.

In the illustrated example, the base 102 and the lid 104 are pivotably coupled at their rear and bottom edges 114, 122. In this example, the base 102 and the lid 104 are hingedly coupled via a first hinge 124 and a second hinge 126 along the same hingeline or axis 128. The first and second hinges 124, 126 couple the rear edge 114 of the base 102 and the bottom edge 122 of the lid 104. As such, the lid 104 can be rotated relative to the base 102 about the hingeline 208 (and vice versa). In other examples, the laptop computer 100 may include more or fewer hinges than the two hinges shown in the illustrated example.

As shown in FIG. 1, the lid 104 carries a screen or display 130. The display 130 is disposed at (and may form part of) front side 116 of the lid 104. The display 130 is to present images in response to electrical signals from one or more of the electrical components 106. To this end, the display 130 is electrically coupled via one or more wires or electrical connectors to the electrical components 106 in the base 102. The wires or electrical connectors may extend through the first and/or second hinges 124, 126, for example. The display 130 may be located in a recess formed in the lid 104 and may be completely or partially surrounded by a bezel 131. The bezel 131 may or may not be flush with the display 130.

The lid 104 may be rotated to a closed position in which the front side 116 of the lid 104 is adjacent and/or engaged with the top side 108 of the base 102. The lid 104 may also be rotated to an open position, as shown in FIGS. 1 and 2, in which the lid 104 is angled relative to the base 102. In some examples, the first and second hinges 124, 126 create sufficient friction to hold the lid 104 (and, thus, the display 130) at any desired angle relative to the base 102.

In this example, the laptop computer 100 is a convertible computer. As such, the lid 104 may be pivoted or rotated 360° or nearly 360° (e.g., ±5°) around (as shown by the arrow 132), such that the back side 118 of the lid 104 is adjacent and/or engaged with the bottom side 110 of the base 102. In this configuration, the display 130 is exposed such that the laptop computer 100 can be handled and operated similar to a tablet. As such, this configuration is referred to as a tablet mode or tablet configuration. In some examples, the display 130 is a touchscreen, which enables the display 130 to accept input from a user (e.g., via the user's fingers, via a stylus, etc.) while the laptop computer 100 is in the tablet mode.

In some examples, the laptop computer 100 is implemented as a dual-display device. In such an example, the base 102 carries a second display 134. In some examples, the second display 134 is disposed on and/or otherwise forms the top side 108 of the base 102 opposite the display 130 (a first display). In other examples, the laptop computer 100 may include a physical keyboard 136 and/or track pad 138 on the top side 108 of the base 102. In such an example, the base 102 carries the physical keyboard 136 and the track pad 138. (The keyboard 136 and the track pad 138 are shown in dashed lines to indicate they could be replaced with the second display 134.)

In the illustrated example of FIGS. 1 and 2, the laptop computer 100 includes an accessory housing 140. The accessory housing 140 may be constructed of plastic and/or any other suitable material(s) and/or combination of material(s). The accessory housing 140 includes one or more cameras, as disclosed in further detail herein, and is moveable relative to the lid 104 and/or the base 102.

In the illustrated example, the accessory housing 140 has a first side 142 (FIG. 1) and a second side 200 (FIG. 2) opposite the first side 142. In this example, the accessory housing 140 includes a first camera 144 (FIG. 1) that faces outward from the first side 142 and a second camera 202 (FIG. 2) that faces outward from the second side 200 and, thus, faces an opposite direction of the first camera 144. Thus, the accessory housing 140 has opposite facing cameras.

The accessory housing 140 is moveable. In the position shown in FIGS. 1 and 2, the accessory housing 140 is disposed along the bottom edge 122 of the lid 104 (e.g., between the base 102 and the lid 104 along the hingeline 128). This position of the accessory housing 140 may be referred to as a first position, a stored position, or a lower position. In this lower position, the first camera 144 faces toward the user and operates as a user facing camera, and the second camera 202 faces outward away from the user and operates as a world facing camera. This position of the first camera 144 is undesirable for some applications because the first camera 144 is angled upward at the user and is likely to capture images of the bottom of the user's face, nose, and chin.

In the illustrated example, the bottom edge 122 of the lid 104 defines a notch 146 to receive the accessory housing 140 in the lower position. In the lower position shown in FIGS. 1 and 2, the accessory housing 140 is disposed in the notch 146. In some examples, the rear edge 114 of the base 102 also includes a notch 148 to provide space for the accessory housing 140 when rotating the lid 104. In some examples, the accessory housing 140 is temporarily held in the notch 146 via holding means, which may be implemented by one or more magnets, snaps, clips, Velcro®, reusable adhesive strips, or other releasable mechanical connectors or releasable chemical connectors.

The accessory housing 140 of the example laptop computer 100 is movably coupled to the lid 104. In the illustrated example, the accessory housing 140 can be moved to another location where the camera angle may be better for some applications. In this example, the accessory housing 140 is movable to the top edge 120 of the lid 104, which may be referred to as a second position, a deployed position, or an upper position. Referring to FIG. 2, the example laptop computer 100 includes an arm 204 that is pivotably or rotatably coupled to the back side 118 of the lid 104. The arm 204 may also be referred to as a flap or a tab. In this example, the arm 204 is coupled to the back side 118 of the lid 104 for rotation about a hinge 206 defining a hingeline or axis 208. The accessory housing 140 is carried by the arm 204. In this example, the accessory housing 140 is coupled to a distal end 210 of the arm 204. In some examples, the arm 204 is at least partially constructed of a soft or flexible material 212 such as fabric, leather, artificial leather, etc. In some examples, a portion 214 of the flexible material 212 is coupled (e.g., via an adhesive) to the back side 118 of the lid 104. The flexible material 212 forms a living hinge that enables the arm 204 to bend about the axis 208. Therefore, in this example, the arm 204 is pivotably or rotatably coupled to the back side 118 of the lid 104 via a living hinge. In other examples, the arm 204 can be pivotably coupled to the back side 118 of the lid 104 via another type of hinge, such as a mortise or butt hinge, a bi-folding hinge, etc.

Figure 3:
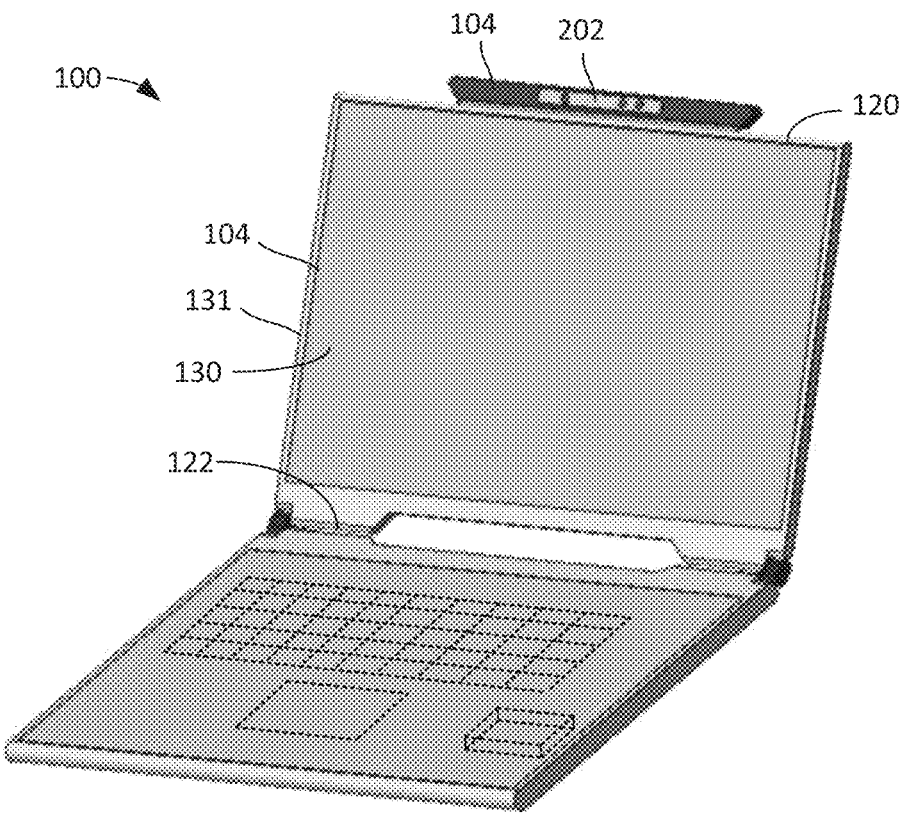
FIG. 3 is a front, right perspective view of the example laptop computer of FIG. 1 with the example accessory housing in an upper position.
Figure 4:
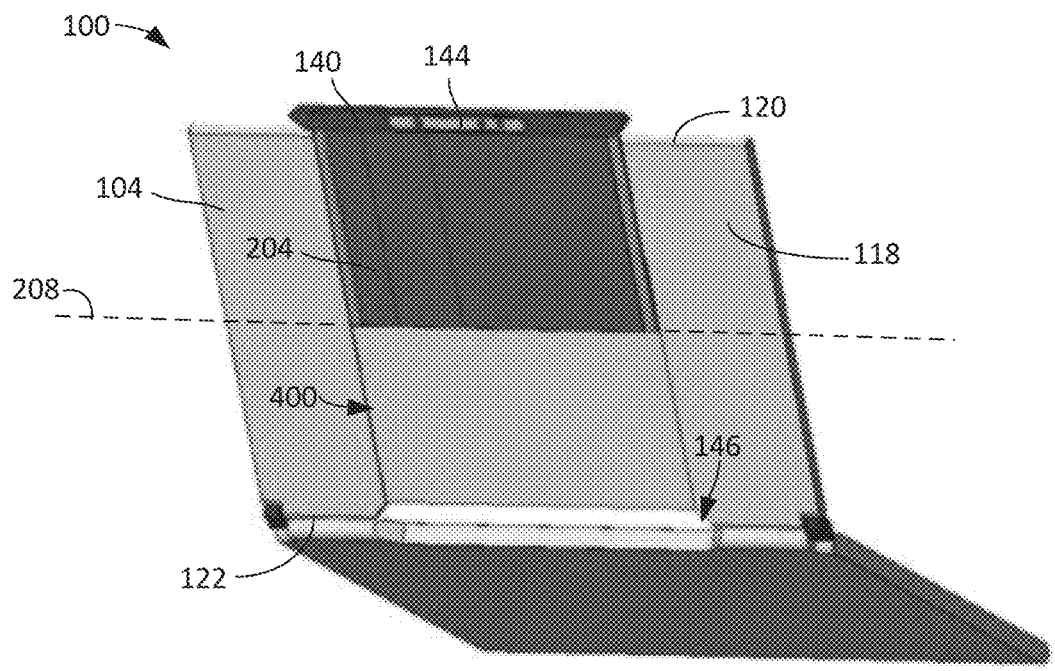
FIG. 4 is a rear, left perspective view of the example laptop computer of FIG. 1 with the example accessory housing in the upper position.

FIGS. 3 and 4 show the laptop computer 100 with the accessory housing 140 on the top edge 120 of the lid 104. As shown in FIG. 4, the arm 204 has been rotated about the axis 208, which moves the accessory housing 140 to the upper position on the top edge 120 of the lid 104. The arm 204 is pivoted to move the accessory housing 140 between the lower position (FIGS. 1 and 2) in which the accessory housing 140 is disposed on or along the bottom edge 122 of the lid 104 and the upper position (FIGS. 3 and 4) in which the accessory housing 140 is disposed on or along the top edge 120 of the lid 104. Therefore, the arm 204 implements means for moving the accessory housing 140 between the lower position in which the accessory housing 140 is disposed on or along the bottom edge 122 of the lid 104 and the upper position in which the accessory housing 140 is disposed on or along the top edge 120 of the lid 104.

When moving the accessory housing 140 between the lower position (FIGS. 1 and 2) and the upper position (FIGS. 3 and 4), the accessory housing 140 is flipped upside-down. When the accessory housing 140 is in the lower position, for instance, the first camera 144 faces a first direction, and when the accessory housing 140 is in the upper position, the first camera 144 faces a second direction opposite the first direction. Similarly, when the accessory housing 140 is in the lower position, the second camera 202 faces the second direction, and when the accessory housing 140 is in the upper position, the second camera 202 faces the first direction. Therefore, when the accessory housing 140 is in the upper position, the second camera 202 operates as the user facing camera, and the first camera 144 operates as the world facing camera. For some applications, the position of FIGS. 3 and 4 is a better position for viewing the user via the second camera 202 than in the position shown in FIGS. 1 and 2. In this upper position, the second camera 202 is positioned higher up and in a more favorable portrait image capturing position for a user (e.g., nearer to eye level than in the lower position). A user can easily flip the arm 204 up or down to move the accessory housing 140 between the upper and lower positions. Additionally or alternatively, an actuator can be incorporated into the lid 104 that, when activated (e.g., via command from user), can rotate the arm 204 to move the accessory housing 140 between the upper and lower positions. The first and second cameras 144, 202 may be 2D or 3D cameras.

As shown in FIG. 4, the back side 118 of the lid 104 has a recess 400. When the accessory housing 140 is in the lower position, the arm 204 is at least partially disposed in the recess 400. As such, only a small amount (if any) of the arm 204 protrudes outward from the back side 118 of the lid 104. In the illustrated example, the recess 400 is slightly wider than the arm 204 and extends between the hingeline 208 and the notch 146. In other examples, a recess may not be included.

While in this example the accessory housing 140 has two opposite facing cameras, in other examples, the accessory housing 140 may only have one camera. For example, the accessory housing 140 may only include the second camera 202. In such an example, the second camera is a world facing camera when the accessory housing 140 is in the lower position (FIGS. 1 and 2) and the second camera 202 becomes the user facing camera when the accessory housing 140 is moved to the upper position. In other examples, the accessory housing 140 may include more than two cameras.

Because the camera(s) are incorporated into the movable accessory housing 140 instead of the lid 104, the lid 104 does not need to accommodate the camera(s) and, thus, can be sized relatively thin. Therefore, in some examples, no cameras are incorporated or integrated into the lid 104. Further, the bezel 131 (FIGS. 1 and 3) around the display 130 can remain relatively small, which is desirable to increase (e.g., maximize) screen size. Therefore, the laptop computer 100 of this example has a higher display-to-body ratio than known laptop computers. Further, the camera(s) can remain larger, which equates to better image quality and higher image related features (e.g., 5 MP resolution camera). Also, when transporting the laptop computer 100 in the closed position, for example, the accessory housing 140 can be moved back to the lower position. In this position, the accessory housing 140 is centered along the hingeline 128 and relatively protected from damage, as opposed to remaining sticking out from the top edge 120 of the lid 104 as seen in known designs.

In some examples, in addition to or as an alternative to including the first and second cameras 144, 202, the accessory housing 140 includes one or more antennas, such as radio antenna(s) used to connect the laptop computer 100 to one or more wireless networks. Examples of antennas are shown in further detail in connection with FIG. 12. When the accessory housing 140 is in the upper position, the antennas are disposed in a better position for wireless communication. In particular, the antennas are positioned further from the base 102 that may contain electrical components (e.g., the electrical components 106) that can cause interference. Further, the antennas are free from obstruction by the base 102 and/or the lid 104. Therefore, in some examples, no antennas are incorporated or integrated into the lid 104.

In some examples, the laptop computer 100 includes means for holding the accessory housing 140 in the lower position (i.e., on the bottom edge 122 of the lid 104) and/or in the upper position (i.e., on the top edge 120 of the lid 104). In some examples, the means for holding the accessory housing 140 is implemented by one or more magnets, snaps, clips, Velcro®, reusable adhesive strips, or other releasable mechanical connectors or releasable chemical connectors.

Figure 5:
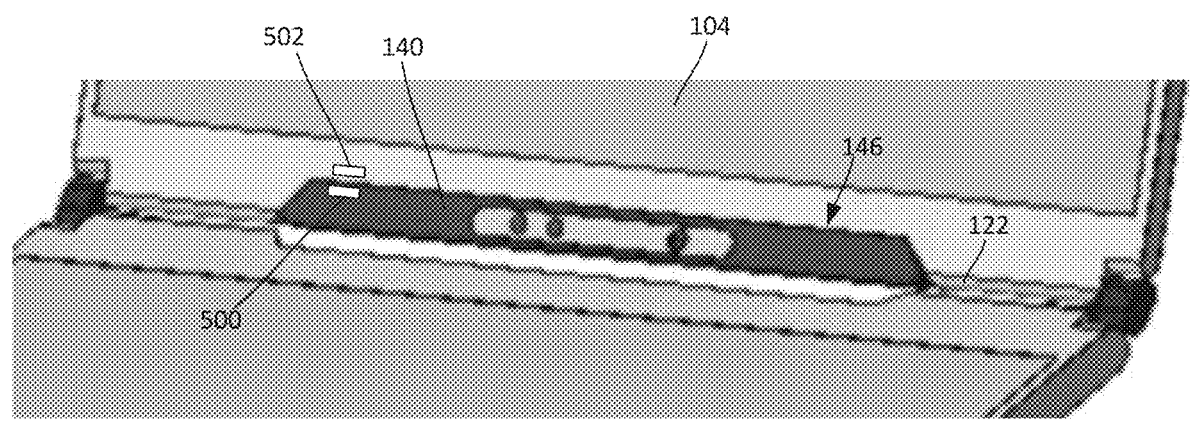
FIG. 5 is an enlarged view of the example accessory housing of FIG. 1 in the lower position showing an example magnet arrangement to hold the accessory housing in the lower position.

FIG. 5 is an enlarged view of the accessory housing 140 in the lower position. The accessory housing 140 is disposed in the notch 146 in the bottom edge 122 of the lid 104. In this example, the accessory housing 140 includes a first magnet 500, and the lid 104 includes a second magnet 502 at or near the bottom edge 122. In this example, the second magnet 502 is near the notch 146. The first magnet 500 may be disposed within the accessory housing 140 or disposed on a surface of the accessory housing 140. Similarly, the second magnet 502 may be disposed within the lid 104 or disposed on a surface of the lid 104. When the accessory housing 140 is in the lower position, the first and second magnets 500, 502 cooperate (magnetically attract) and provide sufficient holding force to hold the accessory housing 140 in the lower position (e.g., in the notch 146). While in this example two magnets are used, in other examples, one of the first or second magnets 500, 502 may instead be implemented as a small block of ferromagnetic material, such as iron.

Figure 6:
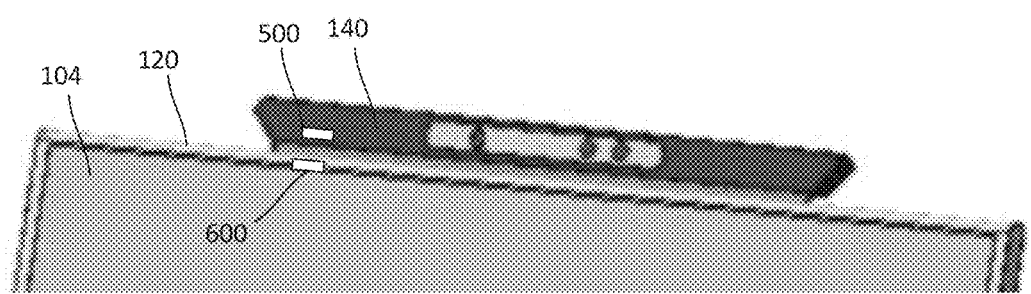
FIG. 6 is an enlarged view of the example accessory housing of FIG. 1 in the upper position showing an example magnet arrangement to hold the example accessory housing in the upper position.

FIG. 6 is an enlarged view of the accessory housing 140 in the upper position. As shown in FIG. 6, the lid 104 includes a third magnet 600 at or near the top edge 120. The third magnet 600 may be disposed within the lid 104 or disposed on a surface of the lid 104. When the accessory housing 140 is in the upper position, the first and third magnets 500, 600 cooperate (magnetically attract) and provide sufficient holding force to hold the accessory housing 140 in the upper position (e.g., on the top edge 120 of the lid 104). Therefore, in this example, the first, second, and third magnets 500, 502, 600 implement the holding means. In other examples, one of the first or third magnets 500, 600 may instead be implemented as a small strips or pieces of ferromagnetic material, such as iron. In other examples, one or more magnets and/or pieces of magnetic material may be incorporated into other locations of the laptop computer 100, such as in the arm 204 and/or the lid 104.

Figure 7A:
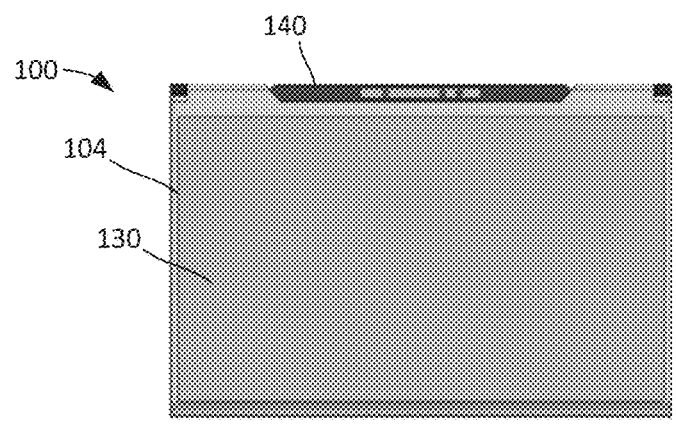
FIGS. 7A and 7B show the example laptop computer of FIG. 1 as used in a tablet mode.
Figure 7B:
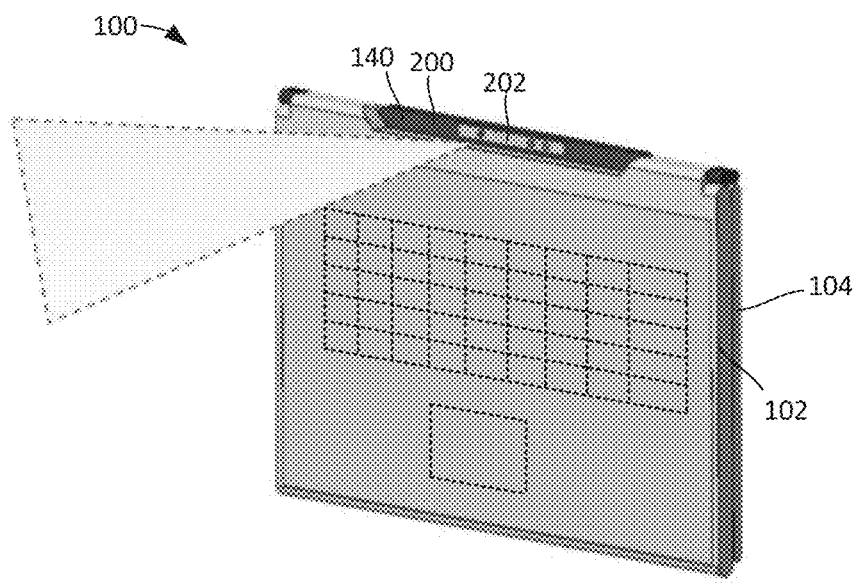

FIGS. 7A and 7B show the example laptop computer 100 in the tablet mode. The lid 104 has been rotated such that the base 102 and the lid 104 are parallel to each other with the display 130 facing outward. The accessory housing 140 is in the lower position, which, in this configuration, positions the accessory housing 140 along the edge of the base 102 and the lid 104 (e.g., along a side of the tablet). The laptop computer 100 can be carried and used as a tablet. Additionally or alternatively, as shown in FIG. 7B, the laptop computer 100 can be used as a camera to take pictures or video. For example, the user can hold the laptop computer 100 with the display 130 facing toward the user, as seen from the viewpoint of FIG. 7A. The second camera 202 on the second side 200 of the accessory housing 140 faces outward, away from the user, as shown in FIG. 7B. The user can view the images or video on the display 130 that are received from the second camera 202.

Figure 8:
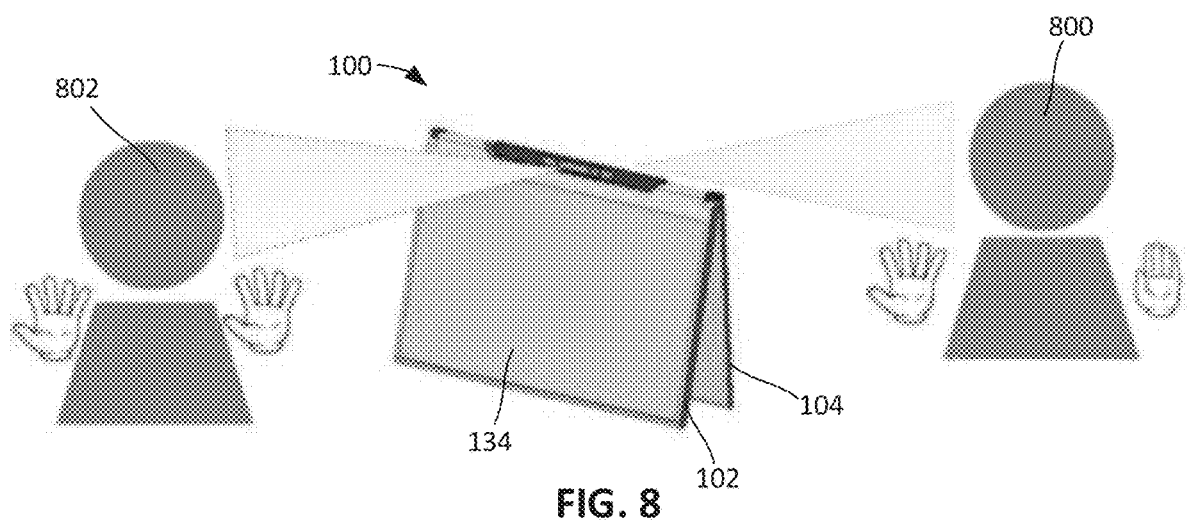
FIG. 8 shows the example laptop computer of FIG. 1 being used for a two-player game.

FIG. 8 shows an example in which the laptop computer 100 is used to play a two-player video game (e.g., ping pong, badminton, tennis, boxing, etc.). In some examples, as disclosed above, the laptop computer 100 is implemented as a dual-display device, and the base 102 includes the second display 134. In the illustrated example, the base 102 and the lid 104 are partially separated and set on a support surface (e.g., a table) in a tent-like configuration (see FIG. 8). In this tent-like configuration, the display 130 (FIG. 1) and the first camera 144 (FIG. 1) are facing a first player 800, and the second display 134 and the second camera 202 are facing a second player 802. This enables the first and second players 800, 802 to view separate screens and to play the game in real time. This also enables the first and second players 800, 802 to see each other. This may be desirable with certain types of games, such as ping pong or tennis, where the two players typically face each other.

Figure 9:
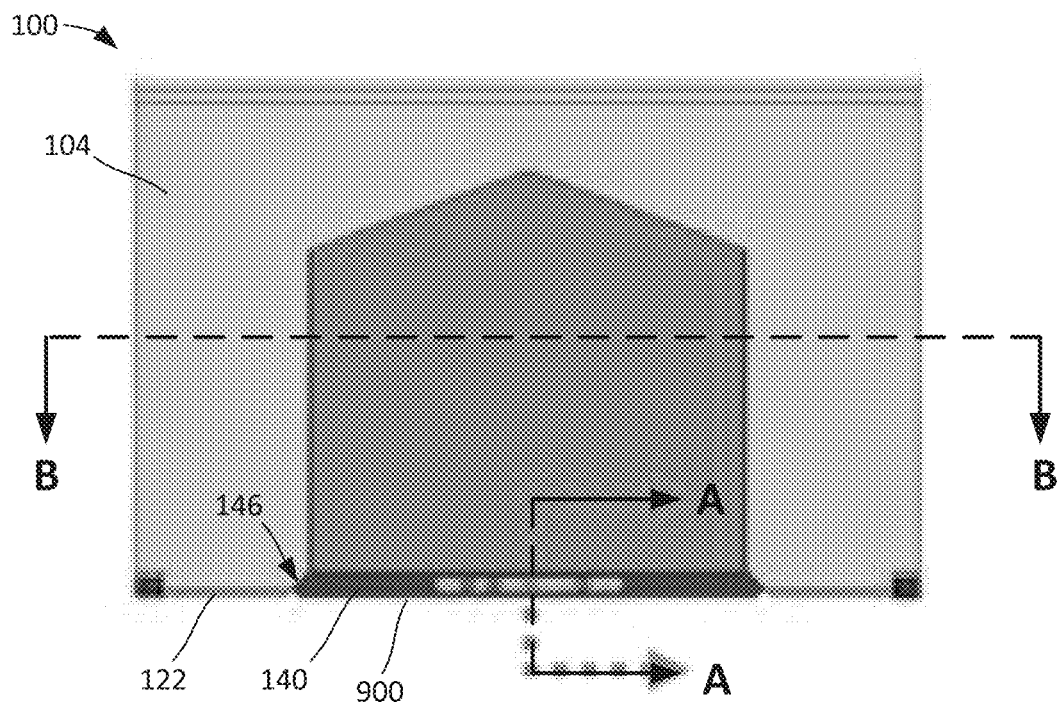
FIG. 9 is a rear view of an example lid of the example laptop computer of FIG. 1 with the example accessory housing in the lower position.

FIG. 9 is a top view of the laptop computer 100 with the lid 104 in the closed position and the accessory housing 140 in the lower position. As shown in FIG. 9, the accessory housing 140 is disposed in the notch 146 formed in the bottom edge 122 of the lid 104. A bottom side or end 900 of the accessory housing 140 is substantially aligned or flush with the bottom edge 122 of the lid 104, which reduces potential damage to the accessory housing 140.

Figure 10:
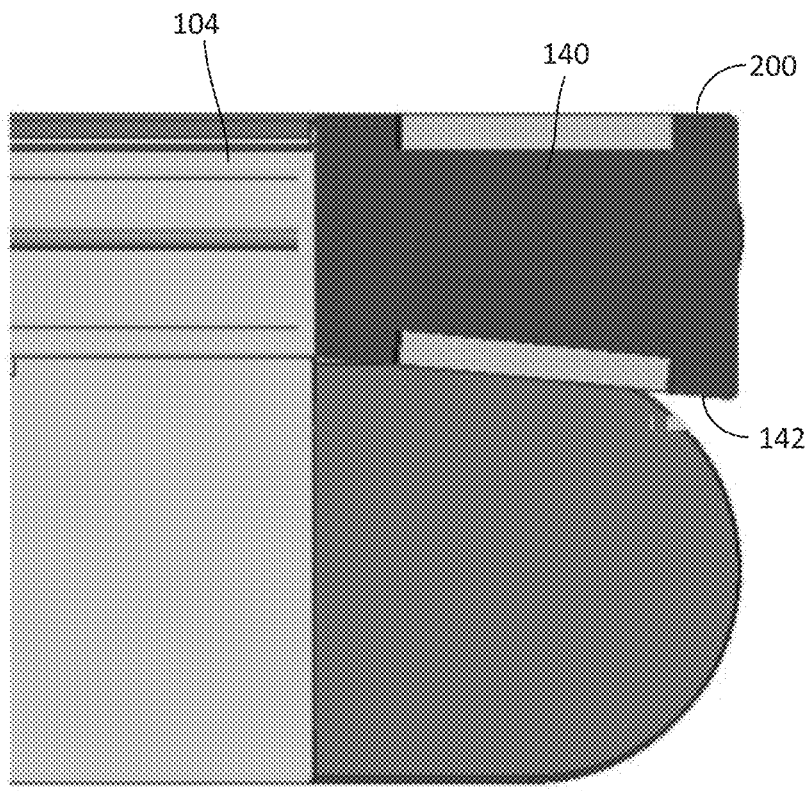
FIG. 10 is a cross-sectional view of the example laptop computer taken along line A-A of FIG. 9 in which the example lid is in a closed position.

FIG. 10 is a cross-sectional view taken along line A-A of FIG. 9. As shown in FIG. 10, the accessory housing 140 is about the same thickness as the lid 104. Thus, the accessory housing 140 does not substantially increase the total thickness of the laptop computer 100 in the closed position.

Figure 11:
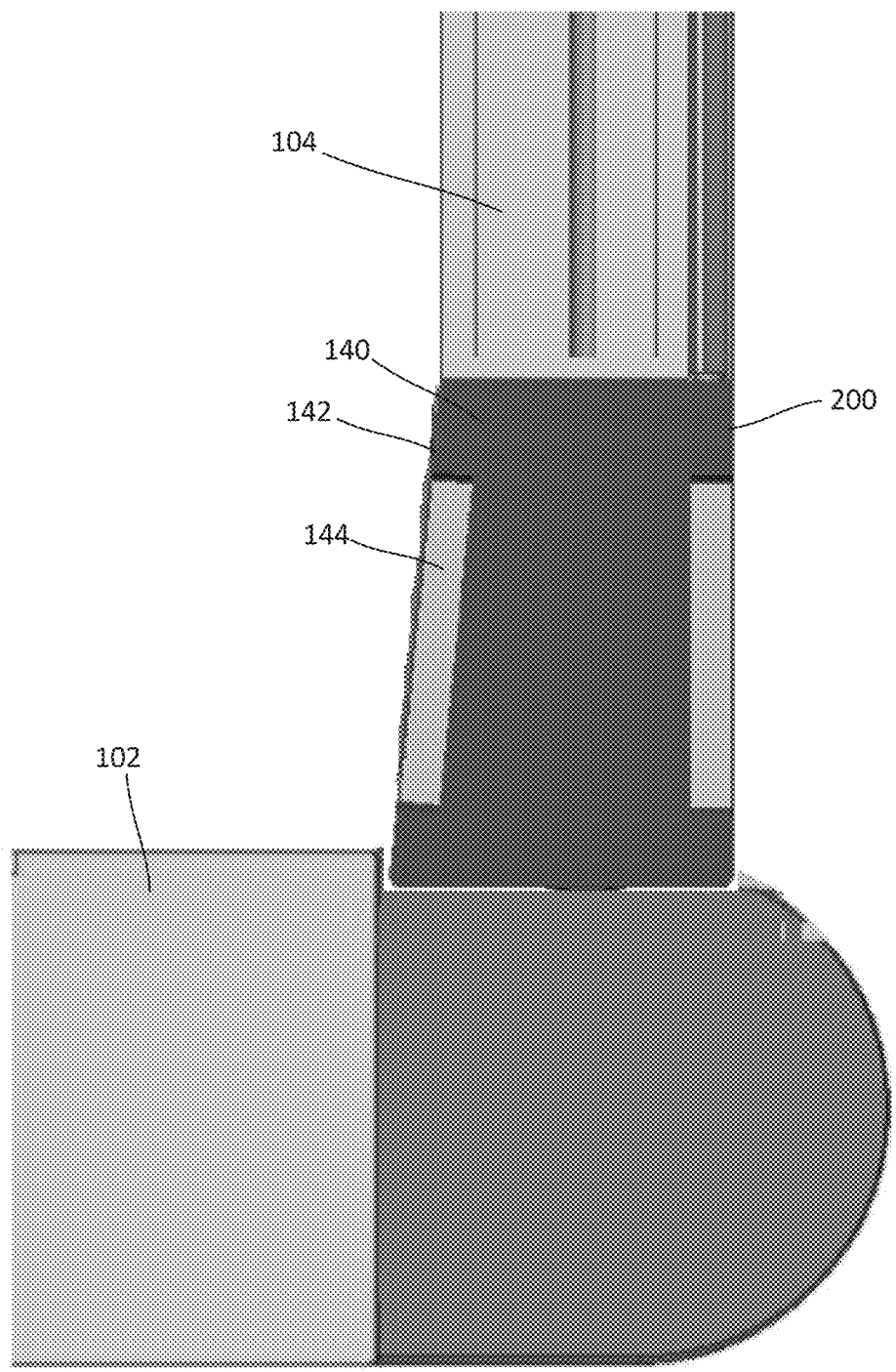
FIG. 11 is a cross-sectional view of the example laptop computer taken along the same line as in FIG. 10 in which the example lid has been rotated to an open position.

FIG. 11 shows the lid 104 as open to about 90° relative to the base 102. As can be seen from FIGS. 10 and 11, in this example, the first side 142 of the accessory housing 140 is slightly angled relative to the second side 200 of the accessory housing 140. Therefore, when the lid 104 is opened and the accessory housing 140 is in the lower position, the first camera 144 on the first side 142 of the accessory housing 140 is angled slightly upward toward the user.

Figure 12:
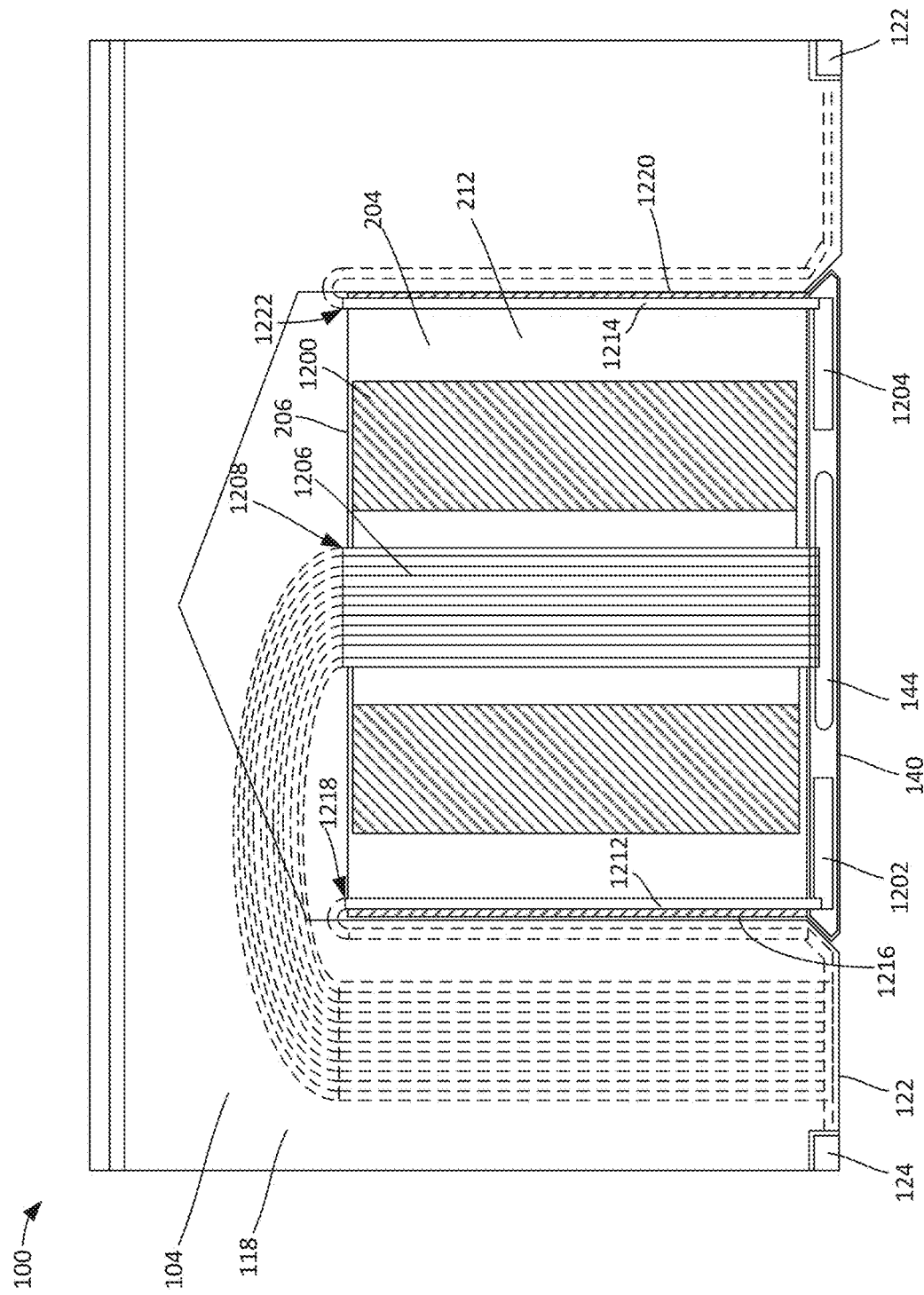
FIG. 12 a rear view of the example lid of the example laptop computer of FIG. 1 in which an example arm and the example accessory housing have been cross-sectioned to expose various electrical connectors.

FIG. 12 is a top view of the lid 104 of the laptop computer 100 in which the arm 204 and the accessory housing 140 have been cross-sectioned. The accessory housing 140 is in the lower position in FIG. 12.

In the illustrated example, the arm 204 includes a stiffener 1200. The stiffener 1200 is at least partially wrapped in the flexible material 212. The stiffener 1200 may be construed of any relatively rigid material, such as plastic, metal, etc. The flexible material 212 may be at least one of fabric (e.g., nylon, denim, cotton, etc.), leather, or plastic, for example. In other examples, the flexible material 212 can additionally or alternatively include other flexible materials.

As disclosed above, the accessory housing 140 can include one or more antennas for wireless communication. In the illustrated example, the accessory housing 140 includes a first antenna 1202 and a second antenna 1204. In some examples, one of the first antenna 1202 or the second antenna 1204 is a transmitter and the other of the first antenna 1202 or the second antenna 1204 is a receiver. In other examples, both the first and second antennas 1202, 1204 are transceivers (transmitter and receivers). In other examples, the accessory housing 140 may include only one antenna or may include more than two antennas. In the illustrated example, the first and second antennas 1202, 1204 are disposed near the ends of the accessory housing 140, such that the first and second cameras 144, 202 (only the first camera 144 is shown in FIG. 12) are disposed between the first and second antennas 1202, 1204. The first and second antennas 1202, 1204 can be any type of antenna to support any type of communication protocol, such as wireless local area network (WLAN), WiFi, Bluetooth®, and/or cellular (e.g., Long-Term Evolution (LTE), 5G, etc.) communication protocol. For instance, the first and/or second antennas 1202, 1204 may be WLAN antennas, LTE antenna, and/or or 5G antennas. In some instances, these types of antennas are larger in size. In other examples, the first and/or second antennas 1202, 1204 may be antennas for other types of communication protocol, such as Bluetooth®. The first and/or second antennas 1202, 1204 may be antennas etches on a printed circuit board (PCB) or laser etched on a chassis, such as on the accessory housing 140, for example.

To connect the first and second cameras 144, 202 and the first and second antennas 1202, 1204 to the electrical components 106 in the base 102 (FIG. 1), the laptop computer 100 includes one or more electrical connectors (e.g., a bus, wires, flex cables, etc.) extending through the arm 204 and/or the lid 104. For example, as shown in FIG. 12, the laptop computer 100 includes a flexible printed circuit (FPC) or FPC board 1206. The FPC 1206 is connected to the first and second cameras 144, 202 in the accessory housing 140. A portion of the FPC 1206 extends through the arm 204. The FPC 1206 is routed through an opening 1208 in the back side 118 of the lid 104 (near the hinge 206) and traverses down to the bottom edge 122 of the lid 104. In some examples, the FPC 1206 is connected through the second hinge 124 to the electrical components 106 in the base 102 (FIG. 1). In other examples, the FPC 1206 is connected via another connection to the base 102. Therefore, the FPC 1206 extends within the lid 104 and the arm 204 to electrically couple the accessory housing 140 to the electrical components 106 (e.g., an electrical circuit) in the base 102. In some examples, the portion of the FPC 1206 in the arm 204 is enclosed within and extends through the stiffener 1200, an example of which is shown in connection with the FIG. 13.

To connect the first and second antennas 1202, 1204 to electrical components 106 in the base 102, the laptop computer 100 includes first and second cables 1212, 1214 (e.g., coaxial cables). The first cable 1212, which is electrically coupled to the first antenna 1202, extends along a first side 1216 of the arm 204. The first cable 1212 extends through an opening 1218 in the back side 118 of the lid 104 (near the hinge 206) and traverses down to the bottom edge 122 of the lid 104 (as shown in dashed lines). In some examples, the first cable 1212 is connected through the second hinge 124 to the electrical components 106 in the base 102. The first cable 1212 carries signals (e.g., signals being transmitted out, signals being received) between the electrical components 106 in the base 102 and the first antenna 1202. Similarly, the second cable 1214, which is electrically coupled to the second antenna 1204, extends along a second side 1220 of the arm 204. The second cable 1214 extends through an opening 1222 in the back side 118 of the lid 104 and traverses down to the bottom edge 122 of the lid 104 (as shown in dashed lines). The second cable 1214 is connected through the first hinge 124 to the electrical components 106 in the base 102. The second cable 1214 carries signals (e.g., signals being transmitted out, signals being received) between the electrical components 106 in the base 102 and the second antenna 1204.

Figure 13:
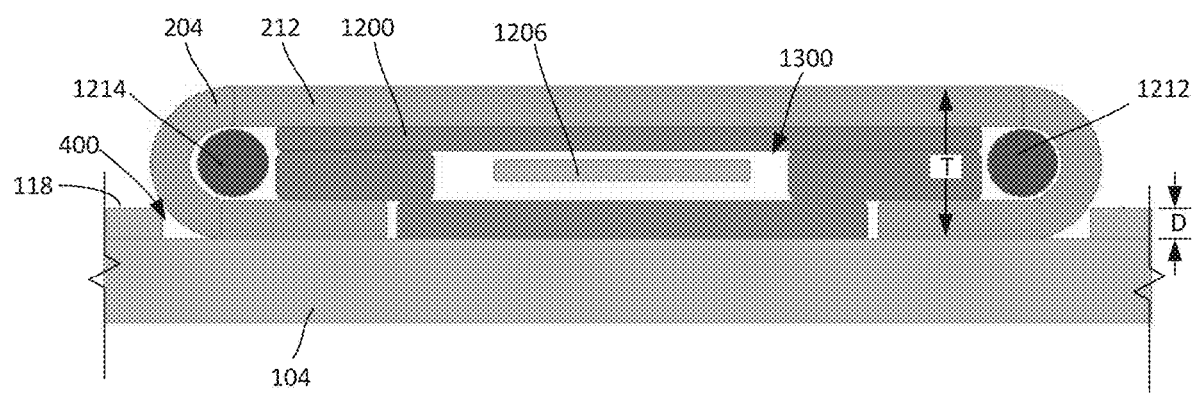
FIG. 13 is a cross-sectional view of an example arm of the example laptop computer of FIG. 1 taken along line B-B of FIG. 9.

FIG. 13 is a cross-sectional view of the arm 204 and the lid 104 taken along line B-B of FIG. 9. As shown in FIG. 13, the arm 204 includes the stiffener 1200. In this example, the stiffener 1200 has an inner passage or channel 1300 through which the FPC 1206 extends. The stiffener 1200 may be constructed of multiple parts or may be constructed as a single unitary part or component. The first and second cables 1212, 1214 are disposed adjacent the stiffener 1200. The flexible material 212 at least partially surrounds the stiffener 1200 and the first and second cables 1212, 1214.

Also shown in FIG. 13 is the recess 400 formed in the back side 118 of the lid 104. When the accessory housing 140 (FIGS. 1 and 2) is in the lower position, the arm 204 is disposed in the recess 400, which helps reduce the amount the arm 204 that protrudes from the back side 118 of the lid 104. In this example, the arm 204 extends outward beyond the back side 118 of the lid 104. In some examples, a thickness T of the arm 204 is about 0.7-1.2 millimeters (mm), which is relatively small. For example, a depth D of the recess 400 may about 0.2 mm, and the thickness T of the arm 204 may about 0.7 mm. As such, the arm 204 only protrudes from the back side of the lid 104 by about 0.5 mm. In other examples, the depth D of the recess 400 and/or the thickness T of the arm 204 can be larger or smaller. In some examples, the recess 400 and the arm 204 are sized such that an outward facing side of the arm 204 is substantially flush or even with the back side 118 of the lid 104.

Figure 14:
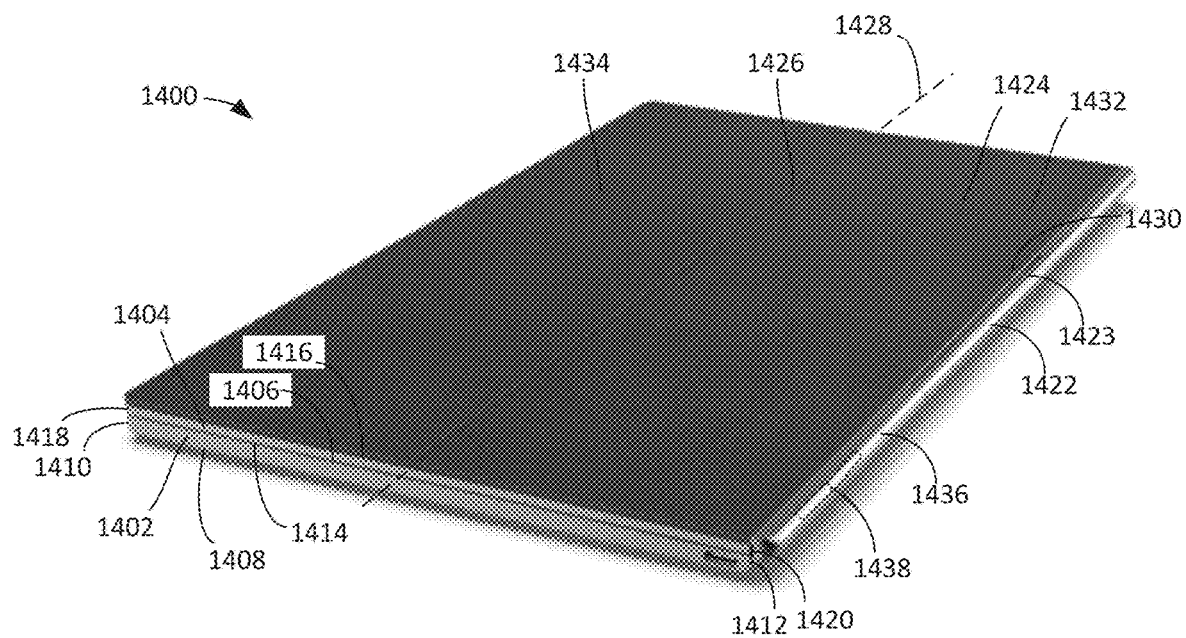
FIG. 14 is rear, right, top perspective view of an example laptop computer constructed in accordance with the teachings of this disclosure. A lid of the example laptop computer is shown in a closed position. The example laptop computer includes an example accessory housing that is shown in a lower position.
Figure 15:
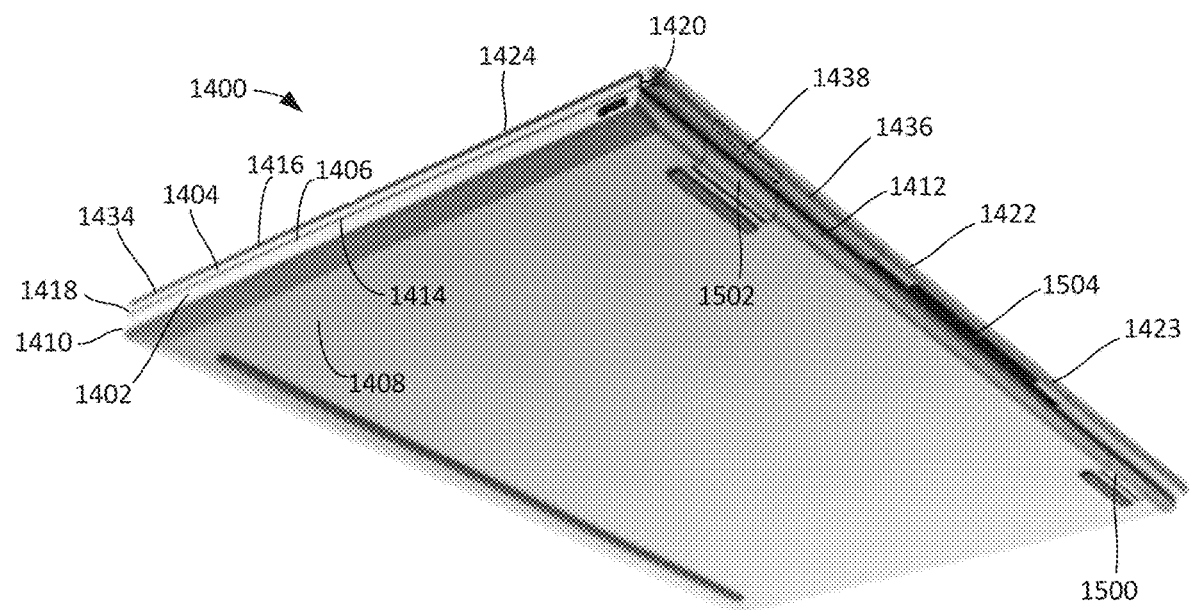
FIG. 15 is a rear, right, bottom perspective view of the example laptop computer of FIG. 14.

FIGS. 14 and 15 are perspective views of another example laptop computer 1400 constructed in accordance with teachings of this disclosure. Similar to the laptop computer 100 disclosed above, the laptop computer 1400 of FIG. 14 includes a base 1402 and a lid 1404 that are hingedly coupled. As shown in FIG. 15, the base 1402 and the lid 1404 are hingedly coupled via first and second hinges 1500, 1502. The lid 1404 can be rotated between a closed position, which is the position shown in FIGS. 14 and 15, and an open position, shown in FIG. 16. The lid 1404 carries a display (shown in FIG. 23) to present images to the user. Similar to the example laptop computer 100 disclosed above, the base 1402 includes electrical components (e.g., processor circuitry, a storage device, a battery, a cooling device, etc.). Further, similar to the example laptop computer 100 disclosed above, the base 1402 may include a physical keyboard and/or a second display.

In the illustrated example of FIGS. 14 and 15, the base 1402 has a top side 1406, a bottom side 1408 opposite the top side 1406, a front edge 1410, and a rear edge 1412 opposite the front edge 1410. The lid 1404 has a front side 1414 (which carries the display), a back side 1416 opposite the front side 1414, a top edge 1418, and a bottom edge 1420 opposite the top edge 1418.

In the illustrated example of FIGS. 14 and 15, the laptop computer 1400 includes an accessory housing 1422. The accessory housing 1422 may be constructed of plastic and/or any other suitable material(s) and/or combination of material(s). The accessory housing 1422 may include one or more cameras, antennas, and/or sensors. In this example, the accessory housing 1422 includes one camera 1504 (FIG. 15). The camera 1504 may be a 2D camera or a 3D camera. In other examples, the accessory housing 1422 may include multiple cameras and the cameras may be facing in different directions. In the illustrated example, the accessory housing 1422 includes two housings or portions referred to as a first housing 1423 and a second housing 1436. The first housing 1423 is disposed in the middle of the second housing 1436. In this example, the camera 1504 is disposed in the first housing 1423.

In the example of FIGS. 14 and 15, the accessory housing 1422 is disposed along the bottom edge 1420 of the lid 1404. This position is referred to as a first position, stored position, or lower position. The accessory housing 1422 is moveable between the lower position, which is the position shown in FIGS. 14 and 15, and an upper position (which may also be referred to as a second position or a deployed position) in which the accessory housing 1422 is disposed at or near (e.g., along) the top edge 1418 of the lid 1404.

To move the accessory housing 1422 between the upper and lower positions, the example laptop computer 1400 includes an arm 1424. The arm 1424 may also be referred to as a flap or a tab. The arm 1424 is pivotably or rotatably coupled to the back side 1416 of the lid 1404. In the illustrated example, the arm 1424 is coupled to the back side 1416 of the lid 1404 via a hinge 1426 defining a hingeline or axis 1428. The accessory housing 1422 is coupled to a distal end 1430 of the arm 1424. In some examples, the arm 1424 is at least partially constructed of a soft or flexible material 1432 such as fabric, leather, leather, artificial leather, etc. Similar to the arm 204 disclosed above, the arm 1424 may include an internal stiffener (e.g., constructed of metal, plastic, cardboard, etc.) at least partially wrapped in the flexible material 1432. One or more wires or connectors may be routed through the arm 1424. In this example, the laptop computer 1400 includes a plate 1434 coupled to the back side 1416 of the lid 1404. The arm 1424 and the plate 1434 may be constructed of the same flexible material 1432. In this example, the hinge 1426 is a living hinge formed by the flexible material 1432. Therefore, in this example, the arm 1424 is pivotably coupled to the back side 1416 of the lid 1404 via a living hinge. In other examples, the arm 1424 can be pivotably coupled to the back side 1416 of the lid 1404 via another type of hinge, such as a mortise or butt hinge, a bi-folding hinge, etc.

In the illustrated example, the arm 1424 and the plate 1434 are substantially the same thickness. As such, when the arm 1424 is in the lower position as shown in FIGS. 14 and 15, the arm 1424 and plate 1434 form a substantially continuous layer or cover on the back side 1416 of the lid 1404. Further, the arm 1424 and the plate 1434 form a layer that is substantially the same size (width and length) as the lid 1404 and completely cover the back side 1416 of the lid 1404. In other examples, the arm 1424 and/or the plate 1434 may be smaller such that at least a portion of the back side 1416 of the lid 1404 is exposed.

As disclosed above, in this example, the accessory housing 1422 includes the first housing 1423 and the second housing 1436. In some examples, the second housing 1436 includes one or more sensors 1438, such as a proximity sensor (e.g., time-of-fly (TOF) sensor), an ambient light sensor, an eye tracking sensor, a human presence sensor, and/or a microphone. One or more of the sensors 1438 may be used for human presence detection and/or artificial intelligence (AI) application. In some examples, the second housing 1436 also include one or more antennas, such as the antennas 1202, 1204 disclosed in connection with FIG. 12.

In this example, the first housing 1423 is disposed in the middle of the second housing 1436. As such, a portion of the second housing 1436 is disposed on either side of the first housing 1423. The sensors 1438 may be disposed in either side of the second housing 1436.

In this example, the first housing 1423 that contains the camera 1504 is rotatably coupled to the second housing 1436. As such, the first housing 1423 can be rotated relative to the second housing 1436 such that the camera 1504 can be directed forward or rearward. In FIGS. 14 and 15 the camera 1504 is facing rearward or downward, which may be useful for protecting the camera 1504 when holding or carrying the laptop computer 1400 in the closed position. In the illustrated example, the first housing 1423 is cylindrical and the second housing 1436 is dome shaped. The first housing 1423 is substantially flush or even with the second housing 1436, which forms a substantially continuous housing or surface along the distal end 1430 of the arm 1424.

When the arm 1424 is in the lower positon, as shown in FIGS. 14 and 15, the accessory housing 1422 is disposed along the bottom edge 1420 of the lid 1404. The accessory housing 1422 is coupled to the distal end 1430 of the arm 1424 and extends downward or outward from the arm 1424. As such, when the arm 1424 is disposed on the back side 1416 of the lid, the accessory housing 1422 hangs over and along the bottom edge 1420 of the lid 1404. In this example, the lid 1404 does not include a notch as in the example laptop computer 100 disclosed above. Therefore, because the accessory housing 1422 is not disposed in a notch, the accessory housing 1422 can be increased or decreased in size (e.g., to accommodate larger or additional sensors, cameras, antennas, etc.).

Figure 16:
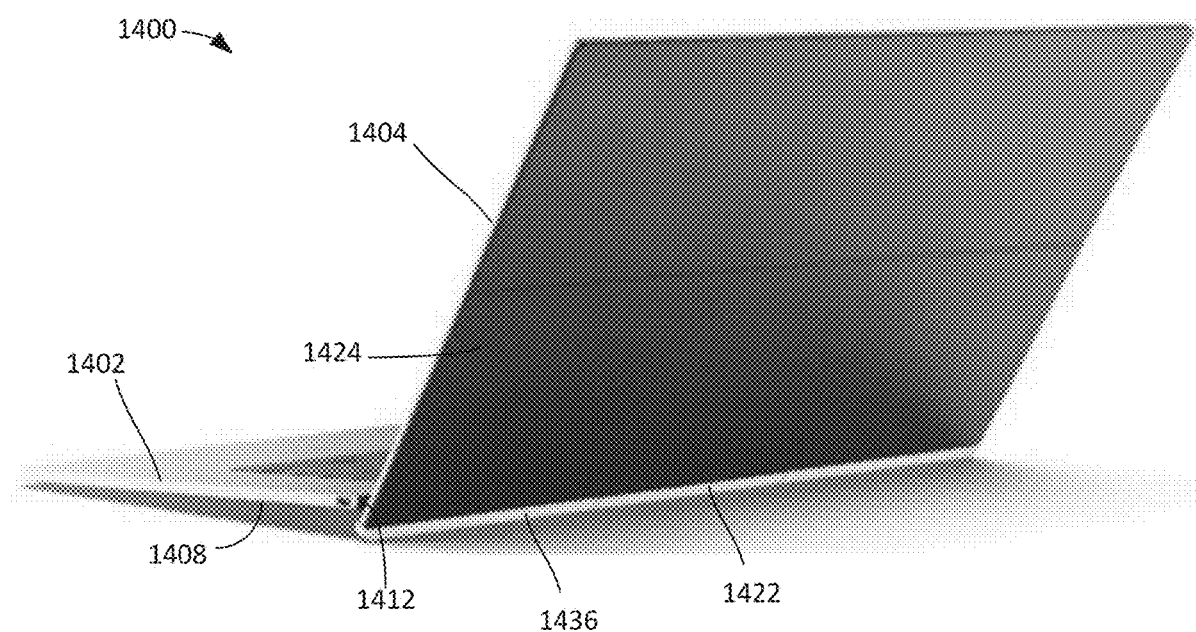
FIG. 16 is a rear, right perspective view of the example laptop computer of FIG. 14 in which the example lid is in an open position.

FIG. 16 is a rear perspective view of the laptop computer 1400 with the lid 1404 in the open position and the arm 1424 with the accessory housing 1422 in the lower position. In this example, the accessory housing 1422 extends beyond the bottom side 1408 of the base 1402. This causes the rear edge 1412 of the base 1402 to be slightly elevated from the supporting surface. This may be beneficial, for example, to angle the keyboard or display on the base 1402 toward the user for a more ergonomic or comfortable position.

Figure 17:
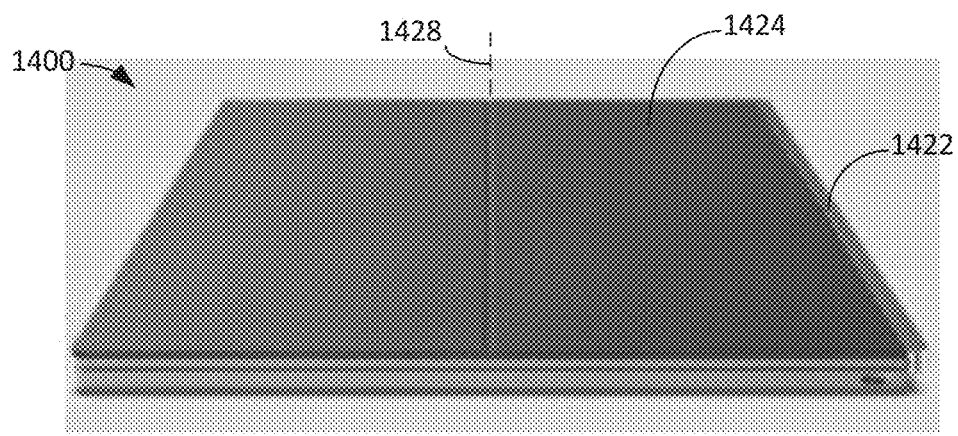
FIGS. 17-19 are right side perspective views of the example laptop computer of FIG. 14 showing a sequence of rotating an example arm to move the example accessory housing from a lower position to an upper position.
Figure 18:
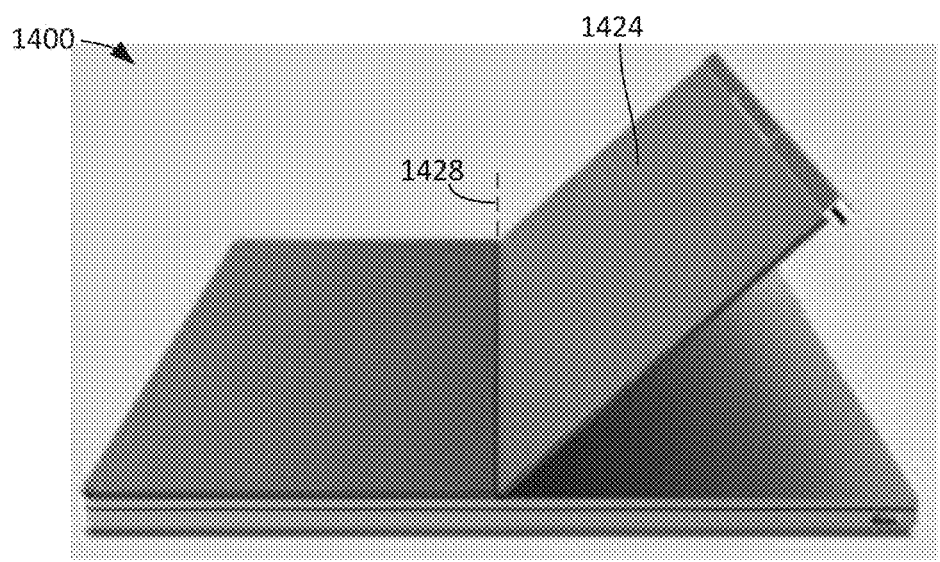
Figure 19:
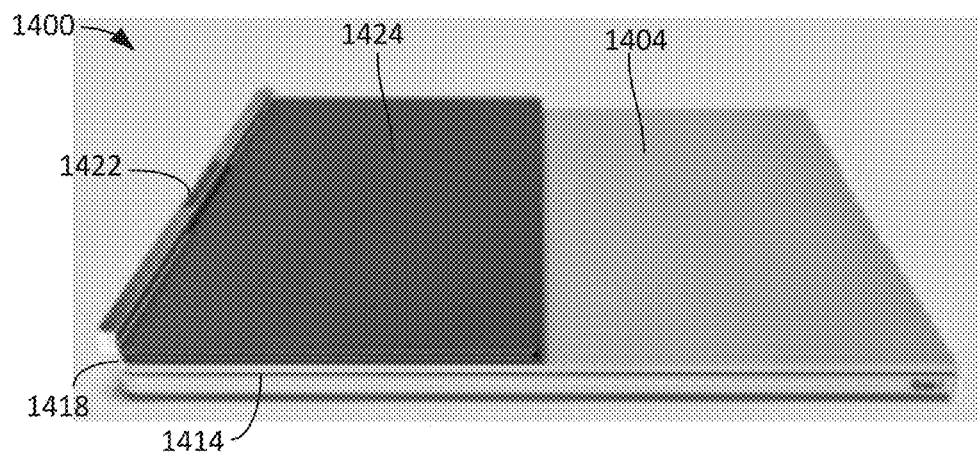

FIG. 17 is a right side perspective view of the example laptop computer 1400 with the accessory housing 1422 in the lower position. To move the accessory housing 1422 to the upper position, the arm 1424 may be lifted and rotated about the hingeline 1428. FIG. 18 shows the laptop computer 1400 with the arm 1424 being rotated about the hingeline 1428. FIG. 19 shows the laptop computer 1400 with the arm 1424 fully rotated or flipped up to the upper position. In the upper position, the accessory housing 1422 is disposed at or near the top edge 1418 of the lid 1404 such that the accessory housing 1422 is visible when looking at the front side 1414 of the lid 1404.

In some examples, the laptop computer 1400 includes means for holding the accessory housing 1422 in the lower position and/or in the upper position. In some examples, the means for holding the accessory housing 1422 is implemented by one or more magnets, snaps, clips, Velcro®, reusable adhesive strips, or other releasable mechanical connectors or releasable chemical connectors.

Figure 20:
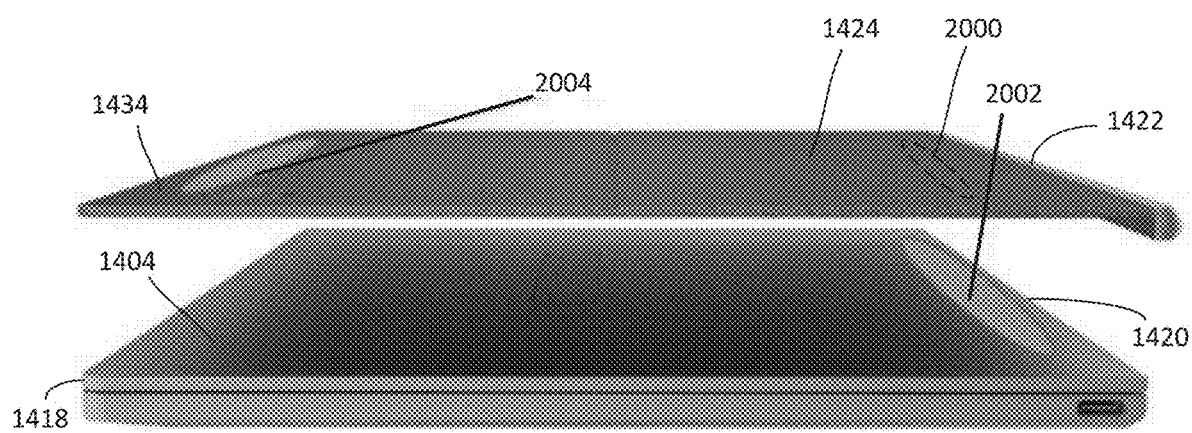
FIG. 20 shows example magnets incorporated into the example laptop computer of FIG. 14 that may be used to hold the example accessory housing in the upper and lower positions.

For example, as shown in FIG. 20, the arm 1424 includes a first magnet 2000, the lid 1404 includes a second magnet 2002, and the plate 1434 includes a third magnet 2004. The first magnet 2000 may be disposed in the arm 1424 or on one or both surfaces of the arm 1424. Similarly, the second magnet 2002 may be disposed in the lid 1404 or on a surface of the lid 1404. In this example, the second magnet 2002 is disposed near the bottom edge 1420 of the lid 1404. The third magnet 2004 may be disposed in the plate 1434 or on a surface of the plate 1434.

When the arm 1424 is in the lower position, the first and second magnets 2000, 2002 magnetically attract and provide sufficient holding force to hold the arm 1424 in place and, thus, hold the accessory housing 1422 in the lower position along the bottom edge 1420 of the lid 1404. When the arm 1424 is rotated to the upper position, the first and third magnets 2000, 2004 magnetically attract and provide sufficient holding force to hold the arm 1424 in place and, thus, hold the accessory housing 1422 in the upper position. Therefore, in this example, the first, second, and third magnets 2000, 2002, 2004 implement the holding means. While in this example three magnets are used, in other examples, one or two of the first, second, or third magnets 2000, 2002, 2004 may instead be implemented as a small strip or piece of ferromagnetic material, such as iron. In other examples, one or more magnets and/or pieces of ferromagnetic material may be incorporated into other locations of the laptop computer 1400, such as in the accessory housing 1422, the top edge 1418 of the lid 1404, and/or the bottom edge 1420 of the lid 1404.

Figure 21:
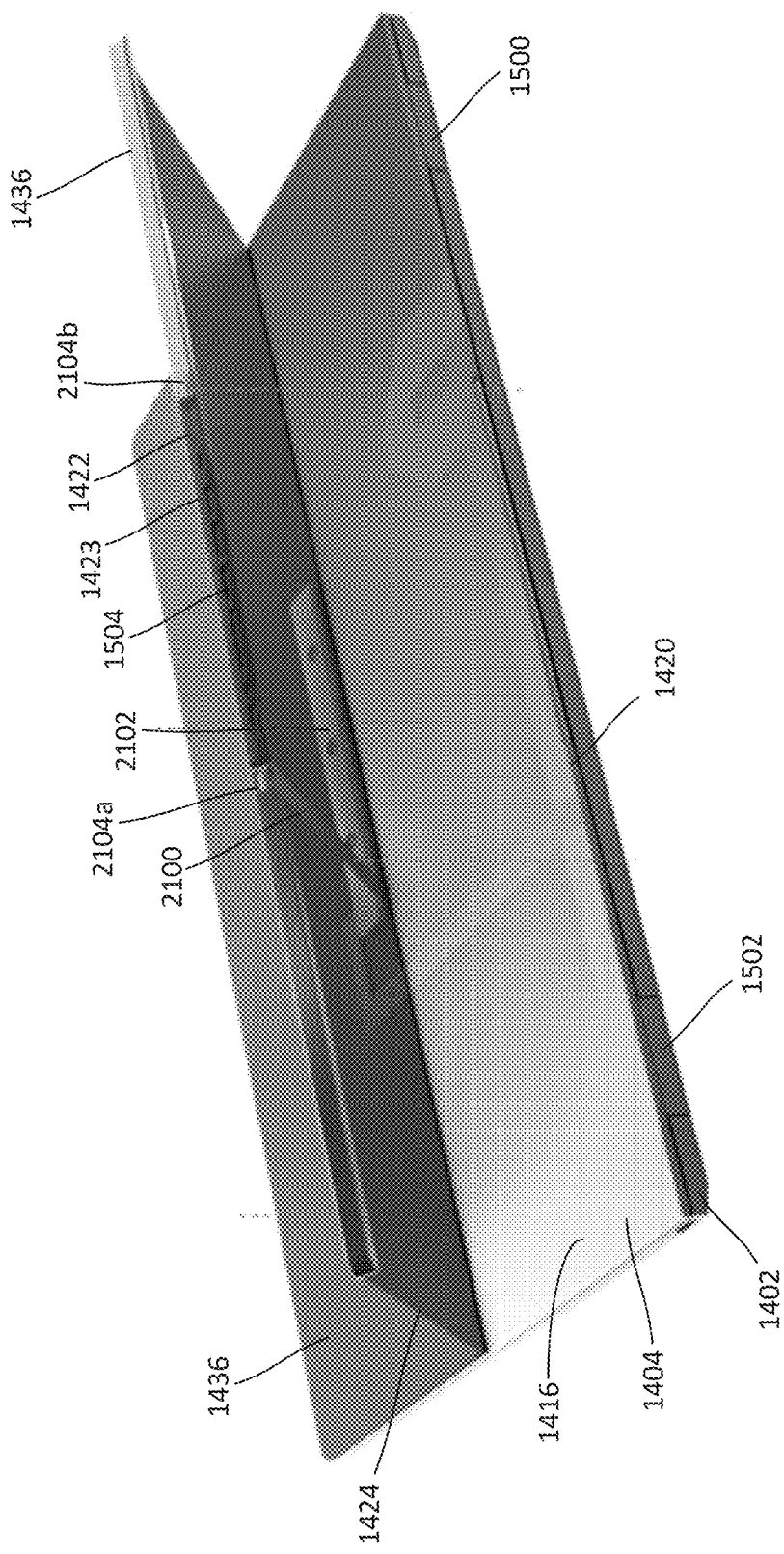
FIG. 21 shows various electrical connectors in the example laptop computer of FIG. 14.

FIG. 21 shows the arm 1424 angled upward from the back side 1416 of the lid 1404. The arm 1424, the plate 1434, and the lid 1404 are shown as partially transparent. As disclosed above, one or more electrical connectors (e.g., wires, flex cables, etc.) may be routed through the arm 1424 to the lid 1404 to electrically couple the camera 1504 and/or the sensors 1438 (FIG. 14) to the electrical components in the base 1402. For example, as shown in FIG. 21, the laptop computer 1400 includes an FPC or FBC board 2100 that is connected to the camera 1504. The FPC 2100 extends through the arm 1424 to the lid 1404. The FPC 2100 is routed through the lid 1404 to the bottom edge 1420 of the lid 1404 to be electrically connected to the electrical components in the base 1402. In some examples, the FPC 2100 is connected through the first or second hinges 1500, 1502 to the electrical components in the base 1402. The sensors 1438 (FIG. 14), antenna(s), and/or other electrical devices in the accessory housing 1422 (e.g., in the second housing 1436) may be similarly electrically connected to the electrical components in the base 1402.

Also shown in FIG. 21 is a bracket 2102 (e.g., a metal bracket) that may be used to fixedly coupled the plate 1434 to the back side 1416 of the lid 1404. In other examples the plate 1434 may be fixedly coupled to the back side 1416 of the lid 1404 via other mechanisms (e.g., an adhesive, strips of hook and loop fasteners, etc.). Also shown in FIG. 21 are hinges 2104a, 2104b (e.g., journals, pins) that enable the first housing 1423 to rotate relative to the second housing 1436.

Figure 23:
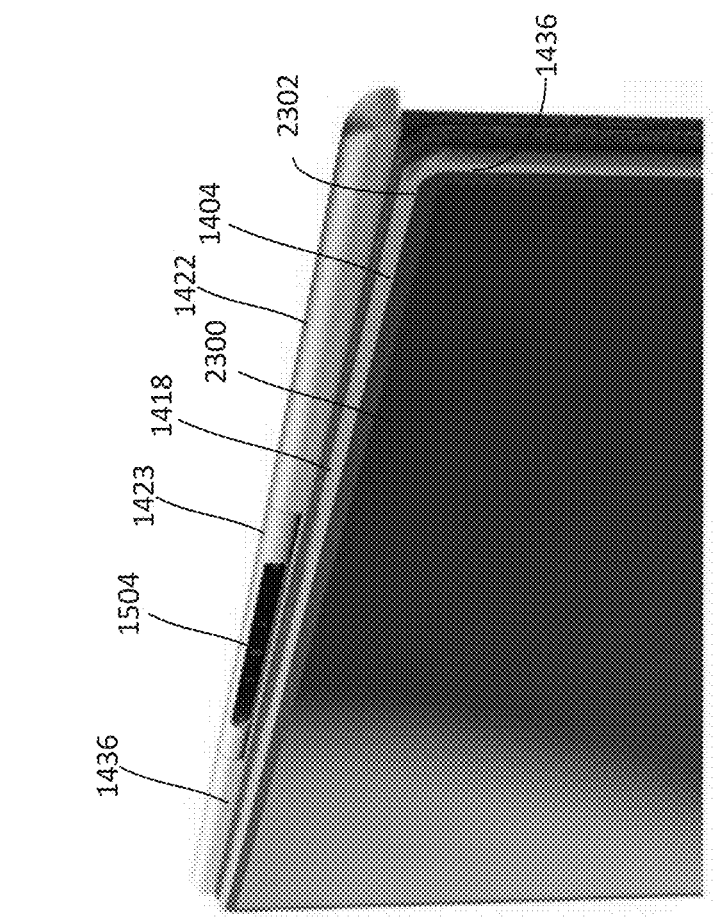
FIG. 23 shows the example accessory housing of the example laptop computer FIG. 14 in the upper position with the example camera facing forward to be used as a user facing camera.
Figure 22:
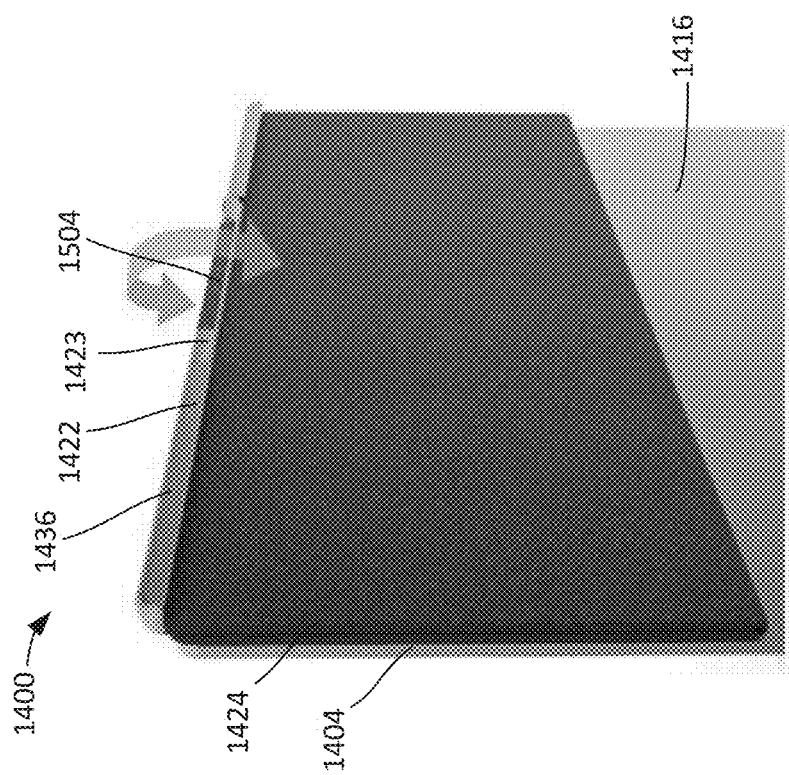
FIG. 22 shows the example accessory housing of the example laptop computer of FIG. 14 in the upper position with an example camera facing rearward to be used as a world facing camera.

FIG. 22 shows the back side 1416 of the lid 1404 with the arm 1424 rotated up such that the accessory housing 1422 is in the upper position. As disclosed above, the accessory housing 1422 includes the first housing 1423 that is rotatably coupled to the second housing 1436. In FIG. 22, the camera 1504 is facing rearward and can be used as a world facing camera. The first housing 1423 can be rotated to turn the camera 1504 toward the user, as shown in FIG. 23. The first housing 1423 may be rotated by the user manually spinning the first housing 1423. In some examples, the first housing 1423 is rotatable 180° relative to the second housing 1436. In other examples, the first housing 1423 may be rotatable more or less than 180° relative to the second housing 1436. Additionally or alternatively, an actuator may be incorporated into the accessory housing 1422 to rotate the first housing 1423 automatically (e.g., by pressing a key on the keyboard).

FIG. 23 also shows an example display 2300 on the front side of the lid 1404. As shown in FIG. 23, the accessory housing 1422 (the first and second housings 1423, 1436) is disposed above the top edge 1418 of the lid 1404. This is a favorable portrait image capturing position for a user. This is also a favorable position for the sensor(s) 1438 (FIG. 14) in the second housing 1436 and/or antenna(s). Further, a bezel 2302 around the display 2300 can be designed relatively small because the camera 1504, the sensor(s) 1438 (FIG. 14), and/or the antennas are not disposed in the lid 1404.

Figure 24:
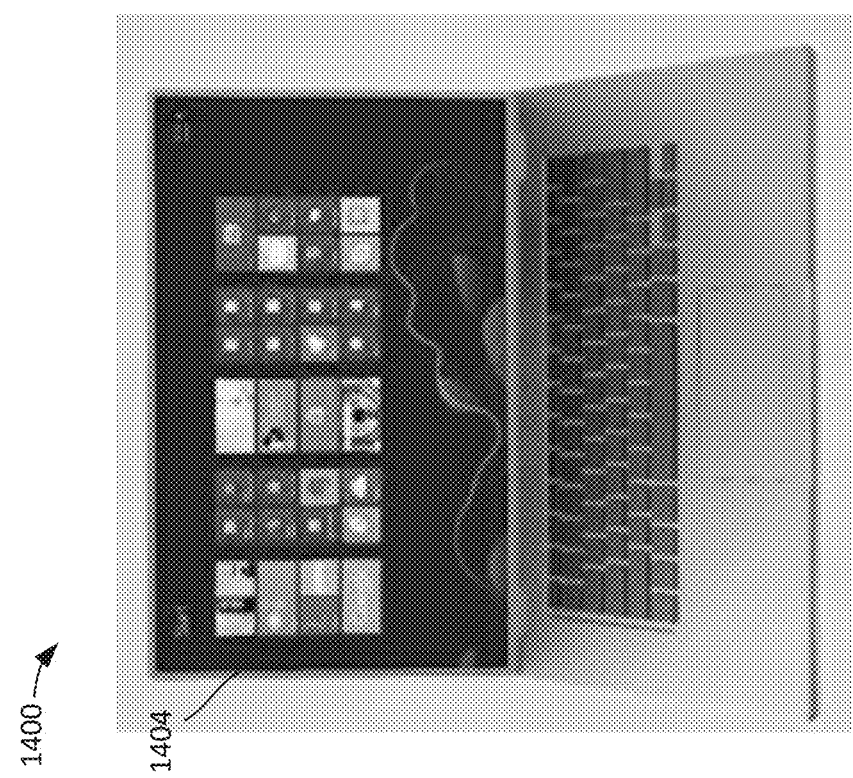
FIG. 24 shows the example laptop computer of FIG. 14 with the example lid in the open position and the example accessory housing in the lower position and not visible.

FIG. 24 shows the laptop computer 1400 with the lid 1404 in the open position. The accessory housing 1422 (FIG. 14) is in the lower position and are not visible by the user. This may be considered a privacy mode, because the camera 1504 cannot film or record the user. As such, the user can keep in the accessory housing 1422 in the lower position when he/she desires privacy.

Figure 25:
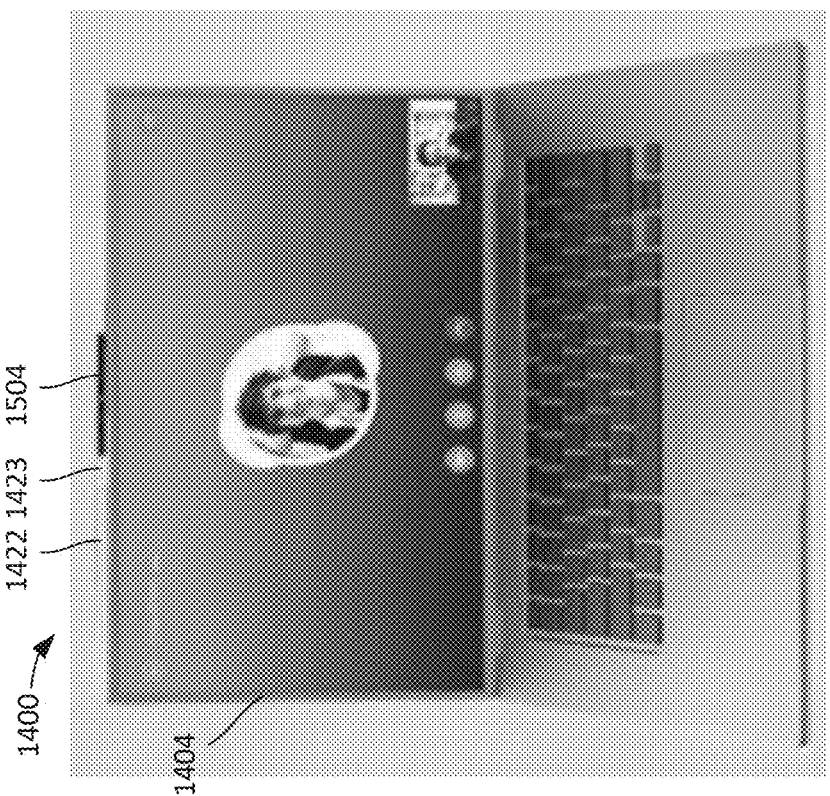
FIG. 25 shows the example laptop computer of FIG. 14 with the example lid in the open position and with the accessory housing in the upper position and the example camera facing toward the user to be used as a user facing camera.

FIG. 25 shows the laptop computer 1400 with the lid 1404 in the open position. The accessory housing 1422 has been moved to the upper position and are visible over the top edge 1418 of the lid 1404. In FIG. 25, the first housing 1423 has been position such that the camera 1504 is facing toward the user and can be used as a user facing camera (e.g., for video conferencing).

Figure 26:
FIG. 26 shows the example laptop computer of FIG. 14 with the example lid in the open position and with the accessory housing in the upper position and the camera facing away from the user to be used as a world facing camera.

The first housing 1423 can be rotated such that the camera 1504 faces rearward, as shown in FIG. 26. In such an example, the camera 1504 can be used as a world facing camera (e.g., to record a class lesson, presentation, or a press conference). In some examples, the camera 1504 can capture 360° videos and/or images for immersive conference call experiences.

While in this example the accessory housing 1422 includes one camera 1504, in other examples, the accessory housing 1422 can include rear and forward facing cameras, similar to the accessory housing 140 disclosed above. In such an example, the first housing 1423 may not rotate.

In some examples, the arm 1424 is moveable by a user. Additionally or alternatively, the laptop computer 1400 may include an actuator to automatically rotate the arm 1424 to move the accessory housing 1422 between the upper and lower positions.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

From the foregoing, it will be appreciated that example apparatus and articles of manufacture have been disclosed that enable one or more cameras of a laptop computer (such as a convertible laptop computer) to be moved between two or more image-capturing positions relative to the lid, while making the lid thinner and with a smaller bezel. Examples disclosed herein also enable antenna(s) and other sensors to be moved between two or more positions relative to the lid to improve transmitting/receiving signals.

The following paragraphs discuss examples disclosed herein.

Example 1 is laptop computer comprising a base, a lid movably coupled to the base, a display carried by the lid, an arm pivotably coupled to the lid, and an accessory housing carried by the arm. The arm is pivotable to move the accessory housing between a first position in which the accessory housing is disposed along a bottom edge of the lid and a second position in which the accessory housing is disposed along a top edge of the lid Example 2 includes the laptop computer of Example 1, wherein the lid is hingedly coupled to the base.

Example 3 includes the laptop computer of Examples 1 or 2, wherein the bottom edge of the lid defines a notch to receive the accessory housing in the first position.

Example 4 includes the laptop computer of any of Examples 1-3, wherein the accessory housing includes a first magnet and the lid includes at least one of a second magnet and a ferromagnetic material at or near the bottom edge. The first magnet and the at least one of the second magnet and the ferromagnetic material are to cooperate to hold the accessory housing in the first position.

Example 5 includes the laptop computer of Example 4, wherein the lid includes at least one of a third magnet and a ferromagnetic material at or near the top edge. The first magnet and the at least one of the third magnet and the ferromagnetic material are to cooperate to hold the accessory housing in the second position.

Example 6 includes the laptop computer of any of Examples 1-5, wherein the arm is pivotably coupled to a back side of the lid via a living hinge.

Example 7 includes the laptop computer of any of Examples 1-6, wherein a back side of the lid has a recess. The arm is to be at least partially disposed in the recess when the accessory housing is in the first position.

Example 8 includes the laptop computer of any of Examples 1-7, further including a camera carried by the accessory housing.

Example 9 includes the laptop computer of Example 8, wherein the accessory housing is flipped upside down when moving the accessory housing between the first and second positions, such that when the accessory housing is in the first position, the camera faces a first direction, and when the accessory housing is in the second position, the camera faces a second direction opposite the first direction.

Example 10 includes the laptop computer of Example 9, wherein the camera is a first camera. The laptop computer of Example 10 further including a second camera carried by the accessory housing. The second camera faces an opposite direction the first camera.

Example 11 includes the laptop computer of Example 9, wherein the accessory housing includes a first housing and a second housing. The camera is carried by the first housing. The first housing is rotatably coupled to the second housing such that when the accessory housing is in the second position the first housing can be rotated to face the camera in the first direction or the second direction opposite the first direction.

Example 12 includes the laptop computer of any of Examples 1-11, wherein the accessory housing includes an antenna.

Example 13 includes the laptop computer of Example 12, wherein the antenna is a first antenna, and the accessory housing includes a second antenna and a camera disposed between the first antenna and the second antenna.

Example 14 includes the laptop computer of any of Examples 1-13, further including a flexible printed circuit board extending through the lid and the arm to electrically couple the accessory housing to an electrical circuit in the base.

Example 15 includes the laptop computer of any of Examples 1-14, wherein the arm includes a stiffener at least partially surrounded by a flexible material.

Example 16 includes the laptop computer of any of Examples 1-15, wherein the lid is pivotable relative to the base through nearly 360°.

Example 17 includes the laptop computer of any of Examples 1-16, wherein the base carries a keyboard.

Example 18 includes the laptop computer of any of Examples 1-16, wherein the display is a first display. The laptop computer of Example 18 further including a second display carried by the base.

Example 19 is a laptop computer comprising a base, a lid having a front side with a display and a back side opposite the front side, and an accessory housing moveably coupled to the lid. The accessory housing is movable between a lower position and an upper position relative to the lid. The accessory housing includes a first camera and a second camera facing opposite the first camera, such that in the lower position, the first camera is a user facing camera and the second camera is a world facing camera, and in the upper position, the second camera is the user facing camera and the first camera is the world facing camera.

Example 20 includes the laptop computer of Example 19, wherein, in the upper position, the accessory housing is disposed along a first edge of the lid, and in the lower position, the accessory housing is disposed along a second edge of the lid opposite the first edge.

Example 21 includes the laptop computer of Examples 19 or 20, wherein the accessory housing includes an antenna.

Example 22 is laptop computer comprising a base, a lid having a front side with a display and a back side opposite the front side, an accessory housing, and means for moving the accessory housing between a first position in which the accessory housing is disposed along a bottom edge of the lid and a second position in which the accessory housing is positioned on a top edge of the lid.

Example 23 includes the laptop computer of Example 22, further including means for holding the accessory housing in the first position and the second position.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A laptop computer comprising:
a base;
a lid movably coupled to the base;
a display carried by the lid;
an arm pivotably coupled to the lid; and
an accessory housing carried by the arm, the arm pivotable to move the accessory housing between a first position in which the accessory housing is disposed along a bottom edge of the lid and a second position in which the accessory housing is disposed along a top edge of the lid, the bottom edge of the lid defining a notch to receive the accessory housing in the first position.

2. The laptop computer of claim 1, wherein the lid is hingedly coupled to the base.

3. A laptop computer comprising:
a base;
a lid movably coupled to the base;
a display carried by the lid;
an arm pivotably coupled to the lid; and
an accessory housing carried by the arm, the arm pivotable to move the accessory housing between a first position in which the accessory housing is disposed along a bottom edge of the lid and a second position in which the accessory housing is disposed along a top edge of the lid, the accessory housing including a first magnet and the lid including at least one of a second magnet and a ferromagnetic material at or near the bottom edge, the first magnet and the at least one of the second magnet and the ferromagnetic material to cooperate to hold the accessory housing in the first position.

4. The laptop computer of claim 3, wherein the lid includes at least one of a third magnet and a ferromagnetic material at or near the top edge, the first magnet and the at least one of the third magnet and the ferromagnetic material to cooperate to hold the accessory housing in the second position.

5. The laptop computer of claim 1, wherein the arm is pivotably coupled to a back side of the lid via a living hinge.

6. The laptop computer of claim 1, wherein a back side of the lid has a recess, the arm to be at least partially disposed in the recess when the accessory housing is in the first position.

7. The laptop computer of claim 1, further including a camera carried by the accessory housing.

8. The laptop computer of claim 7, wherein the accessory housing is flipped upside down when moving the accessory housing between the first and second positions, such that when the accessory housing is in the first position, the camera faces a first direction, and when the accessory housing is in the second position, the camera faces a second direction opposite the first direction.

9. The laptop computer of claim 8, wherein the camera is a first camera, further including a second camera carried by the accessory housing, the second camera facing an opposite direction of the first camera.

10. The laptop computer of claim 8, wherein the accessory housing includes a first housing and a second housing, the camera carried by the first housing, the first housing rotatably coupled to the second housing such that when the accessory housing is in the second position the first housing can be rotated to face the camera in the first direction or the second direction opposite the first direction.

11. The laptop computer of claim 1, wherein the accessory housing includes an antenna.

12. The laptop computer of claim 11, wherein the antenna is a first antenna, and the accessory housing includes a second antenna and a camera disposed between the first antenna and the second antenna.

13. The laptop computer of claim 1, further including a flexible printed circuit board extending through the lid and the arm to electrically couple the accessory housing to an electrical circuit in the base.

14. The laptop computer of claim 1, wherein the arm includes a stiffener at least partially surrounded by a flexible material.

15. The laptop computer of claim 1, wherein the lid is pivotable relative to the base through nearly 360°.

16. The laptop computer of claim 1, wherein the base carries a keyboard.

17. The laptop computer of claim 1, wherein the display is a first display, further including a second display carried by the base.

* * * * *